United States Patent
Miyazawa et al.

(10) Patent No.: US 7,055,748 B2
(45) Date of Patent: Jun. 6, 2006

(54) BARCODE READER, METHOD AND PROGRAM FOR READING BARCODE, AND MODULE-POINT EXTRACTING APPARATUS

(75) Inventors: Hideo Miyazawa, Tokyo (JP); Isao Iwaguchi, Tokyo (JP); Kozo Yamazaki, Tokyo (JP); Masanori Ohkawa, Tokyo (JP); Mitsuo Watanabe, Tokyo (JP); Takashi Kaku, Tama (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 11/067,342

(22) Filed: Feb. 28, 2005

(65) Prior Publication Data

US 2005/0139676 A1 Jun. 30, 2005

Related U.S. Application Data

(63) Continuation of application No. PCT/JP02/08760, filed on Aug. 29, 2002.

(51) Int. Cl.
*G06K 7/10* (2006.01)

(52) U.S. Cl. ............................. 235/462.25; 235/472.01

(58) Field of Classification Search ...............................
235/462.01–462.45, 472.01, 472.02, 472.03,
235/454, 455, 494; 382/141; 455/456.1
See application file for complete search history.

(56) References Cited

U.S. PATENT DOCUMENTS

| 6,176,422 B1* | 1/2001 | Hattori ........................ 235/375 |
| 2003/0148775 A1* | 8/2003 | Spriestersbach et al. ..... 455/456 |
| 2004/0164160 A1* | 8/2004 | Miyazawa et al. ...... 235/462.16 |
| 2004/0164162 A1* | 8/2004 | Watanabe et al. ....... 235/462.25 |
| 2005/0046584 A1* | 3/2005 | Breed ..................... 340/825.72 |
| 2005/0141760 A1* | 6/2005 | Floeder et al. .............. 382/141 |

FOREIGN PATENT DOCUMENTS

| JP | 3-6748 | 1/1991 |
| JP | 9-34981 | 2/1997 |
| JP | 10-271177 | 10/1998 |

* cited by examiner

*Primary Examiner*—Thien M. Le
(74) *Attorney, Agent, or Firm*—Staas & Halsey LLP

(57) ABSTRACT

A signal fetching unit fetches a signal that includes binarized information disposed with a predetermined information length, from a barcode. A module-frequency extracting unit extracts a module frequency equivalent to a basic unit length in the binarized information from the signal. A frequency shifting unit shifts a frequency to 0 Hz based on the module frequency for the signal. A low pass filter passes a low frequency component included in an output signal from the frequency shifting unit. A module-point extracting unit extracts a module point synchronized with the signal and that has the module frequency, based on the module frequency extracted and an output signal of the low pass filter. A demodulating unit demodulates a character of the barcode based on the module point extracted.

10 Claims, 28 Drawing Sheets

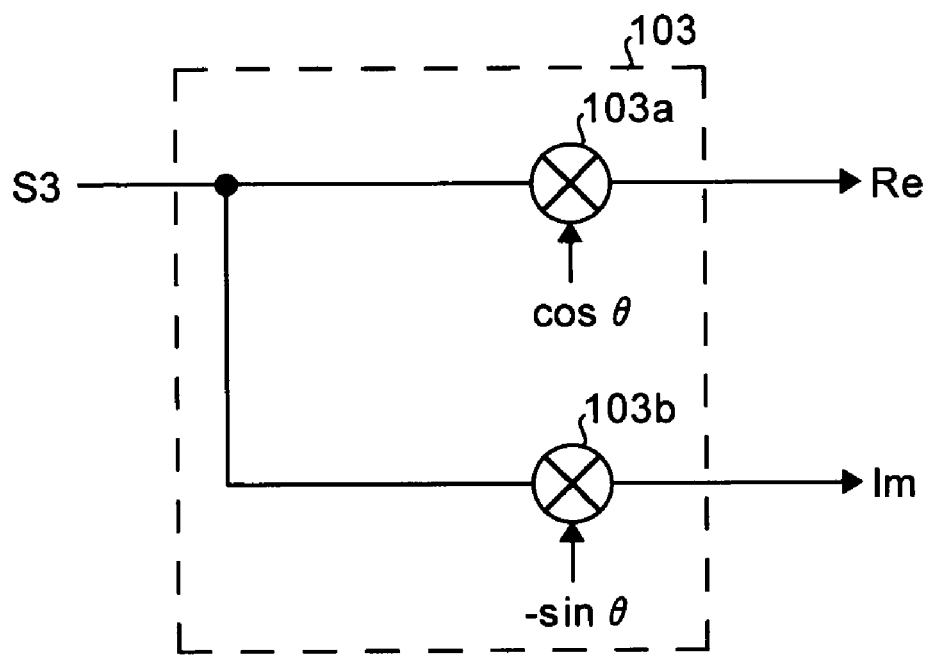

| SAMPLE | INTEGRATION RESULT |
|---|---|
| NO. 0 | 0° |
| FIRST | -1.44° |
| SECOND | -2.88° |
| THIRD | -4.32° |
| FOURTH | -5.76° |
| ⋮ | ⋮ |

FIG.17

| COMPARISON OF TOTAL OF OVERALL THROUGHPUT | |
|---|---|
| BAR-CODE READER | TOTAL OF OVERALL THROUGHPUT |
| CONVENTIONAL BAR-CODE READER 20 | 291157 |
| BAR-CODE READER 100 ACCORDING TO EMBODIMENT (ONLY BASIC PORTION (WITHOUT CALCULATION OF $\Delta f$)) | 69387 |
| BAR-CODE READER 100 ACCORDING TO EMBODIMENT (INCLUDING CALCULATION OF $\Delta f$) | 133260 |

FIG.18

| PROCESSING UNIT | UNIT THROUGH-PUT | NUMBER OF TIMES | OVERALL THROUGHPUT (UNIT THROUGHPUT × NUMBER OF TIMES) |
|---|---|---|---|
| BAR-CODE READER 100 ACCORDING TO EMBODIMENT (ONLY BASIC PORTION (WITHOUT CALCULATION OF $\Delta f$) | | | |
| FREQUENCY SHIFTING UNIT 110 | 12 | 500 | 6000 |
| NARROW-BAND LPF 111 (NUMBER OF TAP COEFFICIENTS 255), 1/8 DCM | 526 | 62.5 | 32875 |
| PHASE CALCULATOR 112 | 69 | 62.5 | 4312 |
| PHASE INTEGRATOR 113 | 14 | 500 | 7000 |
| 0° POINT EXTRACTOR 114 (WHEN NOT GREATER THAN 360°) | 8 | 405 | 3240 |
| 0° POINT EXTRACTOR 114 (WHEN GREATER THAN 360°) | 27 | 95 | 2565 |
| DELAY-TIME CALCULATOR 115 | 9 | 95 | 855 |
| DELAY FILTER COEFFICIENT CALCULATOR 116 | 97 | 95 | 9215 |
| DELAY FILTER 39 | 35 | 95 | 3325 |
| | | TOTAL | 69387 |

FIG.19

| BAR-CODE READER 100 ACCORDING TO EMBODIMENT (INCLUDING CALCULATION OF Δf) | | | |
|---|---|---|---|
| PROCESSING UNIT | UNIT THROUGH-PUT | NUMBER OF TIMES | OVERALL THROUGHPUT (UNIT THROUGHPUT × NUMBER OF TIMES) |
| FREQUENCY SHIFTING UNIT 103 | 12 | 500 | 6000 |
| BROAD-BAND LPF 104 (NUMBER OF TAP COEFFICIENTS 127), 1/4 DCM | 270 | 125 | 33750 |
| PHASE CALCULATOR 105 | 69 | 125 | 8625 |
| PHASE INTEGRATOR 106 | 14 | 125 | 1750 |
| Δf CALCULATOR 107 | 78 | 16 | 1248 |
| FREQUENCY SHIFTING SECTION 110 | 37 | 500 | 18500 |
| NARROW-BAND LPF 111 (NUMBER OF TAP COEFFICIENTS 255), 1/8 DCM | 526 | 62.5 | 32875 |
| PHASE CALCULATOR 112 | 69 | 62.5 | 4312 |
| PHASE INTEGRATOR 113 | 14 | 500 | 7000 |
| 0° POINT EXTRACTOR 114 (WHEN NOT GREATER THAN 360°) | 8 | 405 | 3240 |
| 0° POINT EXTRACTOR 114 (WHEN GREATER THAN 360°) | 27 | 95 | 2565 |
| DELAY-TIME CALCULATOR 115 | 9 | 95 | 855 |
| DELAY FILTER COEFFICIENT CALCULATOR 116 | 97 | 95 | 9215 |
| DELAY FILTER 39 | 35 | 95 | 3325 |
| | | TOTAL | 133260 |

FIG. 32
(PRIOR ART)

| CONVENTIONAL BAR-CODE READER 20 | | | |
|---|---|---|---|
| PROCESSING UNIT | UNIT THROUGH-PUT | NUMBER OF TIMES | OVERALL THROUGHPUT (UNIT THROUGHPUT × NUMBER OF TIMES) |
| GAIN-CHARACTERISTIC CALCULATOR 30 | 523 | 1 | 523 |
| IFFT UNIT 31 (512 POINTS) | 21934 | 1 | 21934 |
| BPF 32 (NUMBER OF TAP COEFFICIENTS 127) | 270 | 500 | 135000 |
| HILBERT CONVERTER 33 (NUMBER OF TAP COEFFICIENTS 65) | 146 | 500 | 73000 |
| PHASE CALCULATOR 34 | 69 | 500 | 34500 |
| PHASE INTEGRATOR 35 | 14 | 500 | 7000 |
| 0° POINT EXTRACTOR 36 (WHEN NOT GREATER THAN 360°) | 8 | 405 | 3240 |
| 0° POINT EXTRACTOR 36 (WHEN GREATER THAN 360°) | 27 | 95 | 2565 |
| DELAY-TIME CALCULATOR 37 | 9 | 95 | 855 |
| DELAY FILTER COEFFICIENT CALCULATOR 38 | 97 | 95 | 9215 |
| DELAY FILTER 39 | 35 | 95 | 3325 |
| | | TOTAL | 291157 |

BARCODE READER, METHOD AND PROGRAM FOR READING BARCODE, AND MODULE-POINT EXTRACTING APPARATUS

This application is a continuing application, filed under 35 U.S.C. §111(a), of International Application PCT/JP02/08760 filed Aug. 29, 2002.

BACKGROUND OF THE INVENTION

1) Field of the Invention

The present invention relates to a barcode reader that reads a barcode (characters) based on light reflected from the barcode (binary information) in which characters are expressed by bar width by using a difference in reflectance of light, a method of reading barcode, a computer program for reading barcode and a module-point extracting unit, and more particularly, to a barcode reader that enables to improve a processing speed, a method of reading barcode, a computer program for reading barcode, and a module-point extracting apparatus.

2) Description of the Related Art

Conventionally, in a field of distribution of products, a barcode that is provided on a product is read optically and information related to the product such as a price and a name of the product is recorded in a register.

In a barcode, information related to a product is encoded as characters and is combined as alternate black and white bars. In a barcode reader, beam light that is emitted from a laser diode is made to scan the barcode, reflected light of the beam is received, and barcode information is read from an electric signal corresponding to width of black bars and white bars.

In this case, the barcode is printed on various media such as an organic material, a can, and mainly a paper.

FIG. 21 is a perspective view of an external configuration of a barcode reader 20. FIG. 22 is a block diagram of an electrical configuration of the barcode reader 20 shown in FIG. 21.

The barcode reader 20 is a reader that reads a barcode 10 optically. In the barcode reader 20 shown in FIG. 22, a laser diode 21 emits light beam L for scanning.

A polygon mirror 22 is formed by a mirror that causes the light beam L from the laser diode 21 to reflect, and is rotated by a motor (omitted in the diagram), and imparts scanning patterns of a plurality of types by changing a direction of reflection of the light beam L.

The light beam L that is reflected by the polygon mirror 22 is irradiated by a reading window 20b that is provided on a housing 20a shown in FIG. 21 on black bars and white bars of the barcode 10 in a direction from a left edge to a right end. A light receiver 23 receives reflected light of the light beam L that is irradiated on the barcode 10 and performs photoelectric conversion to convert the reflected light to an electric signal of an amplitude value according to intensity of the reflected light. An amplifier 24 amplifies a signal from the light receiver 23, which is subjected to photoelectric conversion.

An analog/digital (A/D) converter 25 performs digital sampling of an analog signal that is subjected to photoelectric conversion, which is amplified by the amplifier 24, and outputs as a digital signal that is subjected to photoelectric conversion. An extractor 26, to reduce a signal processing in a latter stage, extracts from the signal that is subjected to photoelectric conversion from the A/D converter 25, only a signal that is reflected from the barcode 10.

A band-limiting differentiator 27, by using module frequency 2f0 that is extracted by a module-frequency extractor 28, which is mentioned later, performs a differentiation process for limiting a band of an output signal of the extractor 26, and outputs a narrow-band differential signal S1 of a waveform pattern shown in FIG. 25 to an amplitude extractor 29 for each module point.

FIG. 26 is a diagram showing a concrete waveform of the narrow-band differential signal S1 shown in FIG. 23.

Thus, the narrow-band differential signal S1 has a waveform such that at a point of switching from the black bar to the white bar, an amplitude is converged to the maximum value, at a point of switching from the white bar to the black bar, the amplitude is converged to the minimum value, and at a flat portion of the black bar and the white bar, the amplitude is converged to zero.

The module-frequency extractor 28 performs processes such as a differentiation process and a squaring process on the output signal of the extractor 26, obtains a frequency spectrum 61 shown in FIG. 24 by an Fast Fourier Transform (FFT) process of a differentiated and squared signal, and calculates frequency of a gain peak of the frequency spectrum 61 as a module frequency (2f0) equivalent to a basic module of the barcode.

The amplitude extractor 29 for each module point shown in FIG. 22 with the narrow-band differential signal S1 and the module frequency 2f0 as input, is provided with a function of extracting a module point corresponding to a boundary of the black bar and the white bar and a function of extracting an amplitude value of the narrow-band differential signal S1, and outputs a ternarized pattern S2 (see FIG. 31A) of "+1", "0", and "−1" with the amplitude value as an edge signal.

FIG. 23 is a block diagram that shows an electrical configuration of the amplitude extractor 29 for each module point. In the amplitude extractor 29 for each module point shown in FIG. 23, a gain-characteristic calculating unit 30 calculates gain characteristic 60 shown in FIG. 24 based on the module frequency 2f0 from the module-frequency extractor 28 (see FIG. 22).

The gain characteristic 60 is for determining filtering of a band pass in a band pass filter (BPF) 32 that is mentioned later and is expressed by parameters such as a module frequency error Δf, a bandwidth fw, and a roll-off factor ROF. These parameters are important values that control an accuracy of barcode reading.

The module frequency error Δf is equivalent to an error in the module frequency 2f0 that is mentioned above. Therefore, a mean frequency of the gain characteristic (bandwidth fw) becomes the module frequency 2f0+ the module frequency error Δf.

Referring back to FIG. 23, an inverse Fast Fourier Transform (IFFT) unit 31 performs inverse Fast Fourier Transform on an output of the gain-characteristic calculating unit 30, calculates a filter coefficient corresponding to the gain characteristic 60 mentioned below, and sets it in the BPF 32.

The BPF 32, based on the filter coefficient corresponding to the gain characteristic 60 shown in FIG. 24, causes the narrow-band differential signal S1 of a waveform pattern shown in FIG. 26 (FIG. 25) to bandpass and outputs a waveform pattern shown in FIG. 27.

In FIG. 27, a waveform with crosses on sample points corresponds to a real part Re and a waveform with circles on sample points corresponds to an imaginary part Im that is subjected to a Hilbert conversion by a Hilbert converter 33. In FIG. 27, a signal of each sample point is vectorized (real part and imaginary part).

Thus, the Hilbert converter 33 is a converter that performs Hilbert conversion of an output signal of the BPF 32 and is provided with a function of vectorizing a signal of each sample point.

Practically, the BPF 32 is a digital filter in which the gain characteristic is set by setting a tap coefficient.

A phase calculating unit 34 calculates a phase of a vector signal that is input. A zero-degree point extractor 36 extracts a point for which a phase becomes 0° by an output of the phase calculating unit, as a sample point. A phase integrator 35 integrates in units of samples the phase that is calculated by the phase calculating unit 34.

A delay-time calculating unit 37 calculates a delay time between the sample point and a point that becomes 0° in FIG. 26. A delay-filter-coefficient calculating unit 38 calculates a delay filter coefficient based on the delay time calculated by the delay-time calculating unit 37, and sets it in a delay filter 39.

The delay filter 39 performs delaying process on the narrow-band differential signal S1 based on the delay filter coefficient, is a filter for causing the sample point to coincide with a zero-degree timing point, and outputs a waveform pattern shown in FIG. 29.

A least mean square (LMS) unit 40 performs an equalization process on an output signal from the delay filter 39 by a method of least squares, and outputs a signal of a waveform pattern shown in FIG. 30.

A ternary processor 41, based on a comparison of amplitude and a threshold value, ternarizes an output of the LMS unit 40 (see FIG. 30) to any one of "+1", "0", and "−1", and output a ternarized pattern S2 of circled portions shown in FIG. 31A.

For example, the ternarized pattern of the circled portions shown in FIG. 31A is demodulated to a character pattern (character string) of the barcode shown in FIG. 31B by a character demodulator 42 (see FIG. 22).

This character pattern is transmitted as a reading result to a host computer 50 by an I/F unit 43 (see FIG. 22).

However, in the conventional barcode reader 20, since the filter coefficient that is to be set in the BPF 32 shown in FIG. 23 is calculated by a method that has many steps of a process called as an inverse Fast Fourier Transform in the IFFT unit 31, there has been a problem of leading to a fall in a processing speed.

Moreover, in the conventional barcode reader 20, for filtering a signal of a narrow-band called as the narrow-band differential signal, the number of taps (for example, 127) of the BPF 32 becomes large and the number of the processing steps increases, thereby leading to a problem of the processing speed becoming slow.

Moreover, in the conventional barcode reader 20, for performing the Hilbert conversion in the Hilbert converter 33 for generating a Hilbert signal, due to a large number of processing steps in this case as well, there has been a problem of leading to the fall in the processing speed.

In FIG. 32, details of an overall throughput in the conventional barcode reader 20 are shown diagrammatically. In FIG. 32, a unit throughput, the number of times, and an overall throughput (unit throughput×number of times) in each processing unit (the gain-characteristic calculating unit 30, the IFFT unit 31, . . . , and the delay filter 39) is shown diagrammatically.

According to FIG. 32, an overall throughput of the IFFT unit 31 mentioned above is 21934 steps. An overall throughput of the BPF 32 is 135000 steps. Moreover, an overall throughput of the Hilbert converter 33 is 73000 steps. The total of the throughput in the barcode reader 20 is 291157 steps.

SUMMARY OF THE INVENTION

It is an object of the present invention to solve at least the above problems in the conventional technology.

A barcode reader according to one aspect of the present invention includes a signal fetching unit that fetches a signal that includes binarized information disposed with a predetermined information length, from a barcode; a module-frequency extracting unit that extracts a module frequency equivalent to a basic unit length in the binarized information, from the signal; a frequency shifting unit that shifts a frequency to 0 Hertz based on the module frequency, for the signal; a low pass filter that passes a low frequency component included in an output signal from the frequency shifting unit; a module-point extracting unit that extracts a module point that is synchronized with the signal and that has the module frequency, based on the module frequency extracted and an output signal of the low pass filter; and a demodulating unit that demodulates a character of the barcode based on the module point extracted.

A method of reading a barcode according to another aspect of the present invention includes fetching a signal that includes binarized information disposed with a predetermined information length, from a barcode; extracting a module frequency equivalent to a basic unit length in the binarized information, from the signal; shifting a frequency to 0 Hertz based on the module frequency, for the signal; passing a low frequency component included in an output signal at the shifting; extracting a module point that is synchronized with the signal and that has the module frequency, based on the module frequency extracted and an output signal at the passing; and demodulating a character of the barcode based on the module point extracted.

A computer-readable recording medium according to still another aspect of the present invention stores a computer program that causes a computer to execute the above method according to the present invention.

A module-point extracting apparatus according to still another aspect of the present invention includes a signal fetching unit that fetches a signal that includes binarized information disposed with a predetermined information length, from a barcode; a module-frequency extracting unit that extracts a module frequency equivalent to a basic unit length in the binarized information, from the signal; a frequency shifting unit that shifts a frequency to 0 Hertz based on the module frequency, for the signal; a low pass filter that passes a low frequency component included in an output signal from the frequency shifting unit; and a module-point extracting unit that extracts a module point that is synchronized with the signal and that has the module frequency, based on the module frequency extracted and an output signal of the low pass filter.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a schematic diagram of a frequency shifting unit 103 shown in FIG. 2;

FIG. 4 is a table for explaining an operation of the frequency shifting unit 103 shown in FIG. 3;

FIG. 17 is a table for comparing an overall throughput of a barcode reader 100 according to the present embodiment and that of a conventional barcode reader 20;

FIG. 18 is a table for explaining details of the overall throughput in the barcode reader 100 (only basic portion (without calculation of Δf)) according to the present embodiment;

FIG. 19 is a table for explaining details of the overall throughput in the barcode reader 100 (including calculation of Δf) according to the present embodiment;

FIG. 32 is a table for explaining details of the overall throughput of the conventional barcode reader 20.

DETAILED DESCRIPTION

Exemplary embodiments of a barcode reader, a method of reading barcode, a computer program for reading barcode, and a module-point extracting unit according to the present invention is described below in detail with reference to the accompanying drawings.

Figure 1:
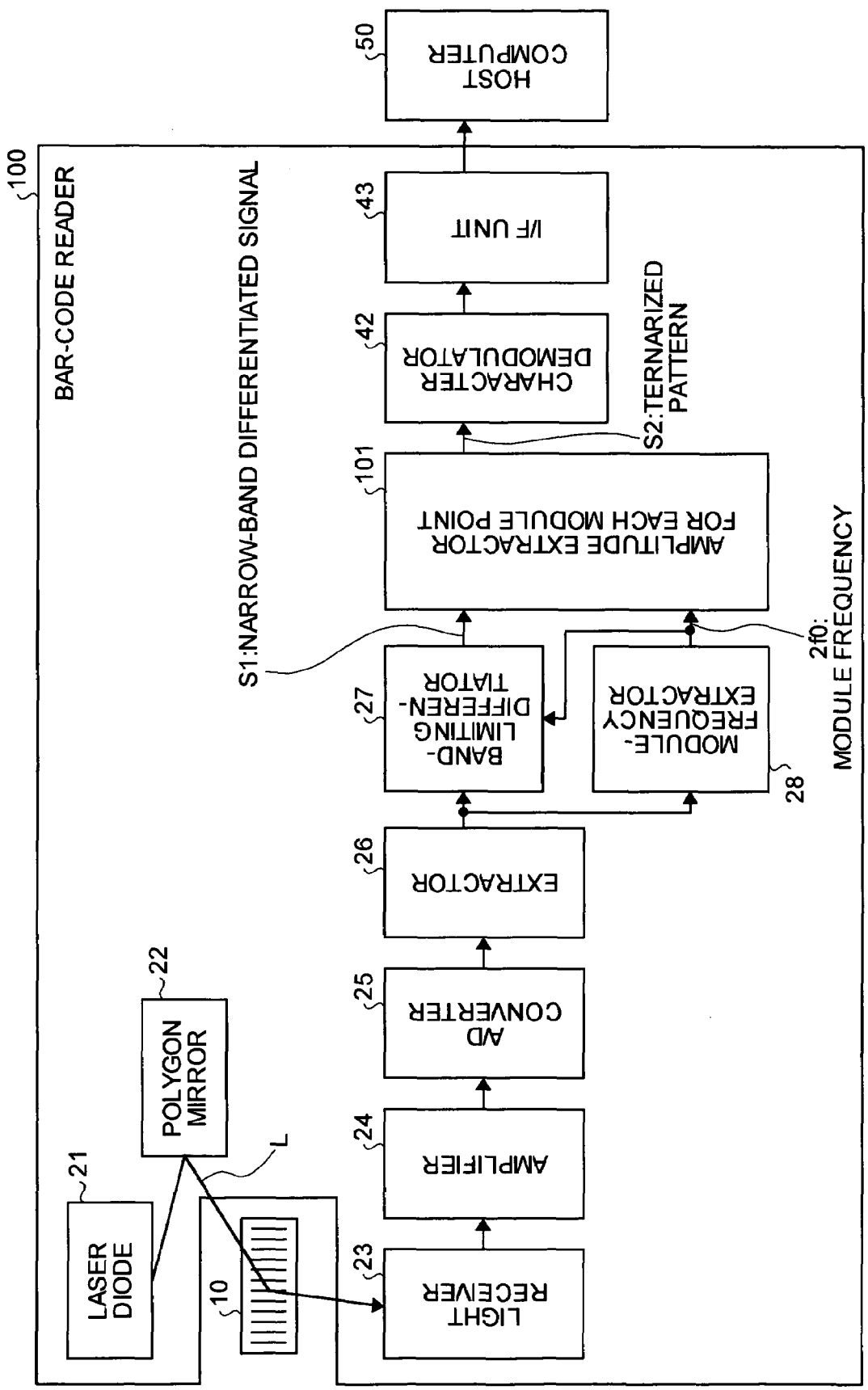
FIG. 1 is a block diagram of a barcode reader according to an embodiment of the present invention.
Figure 22:
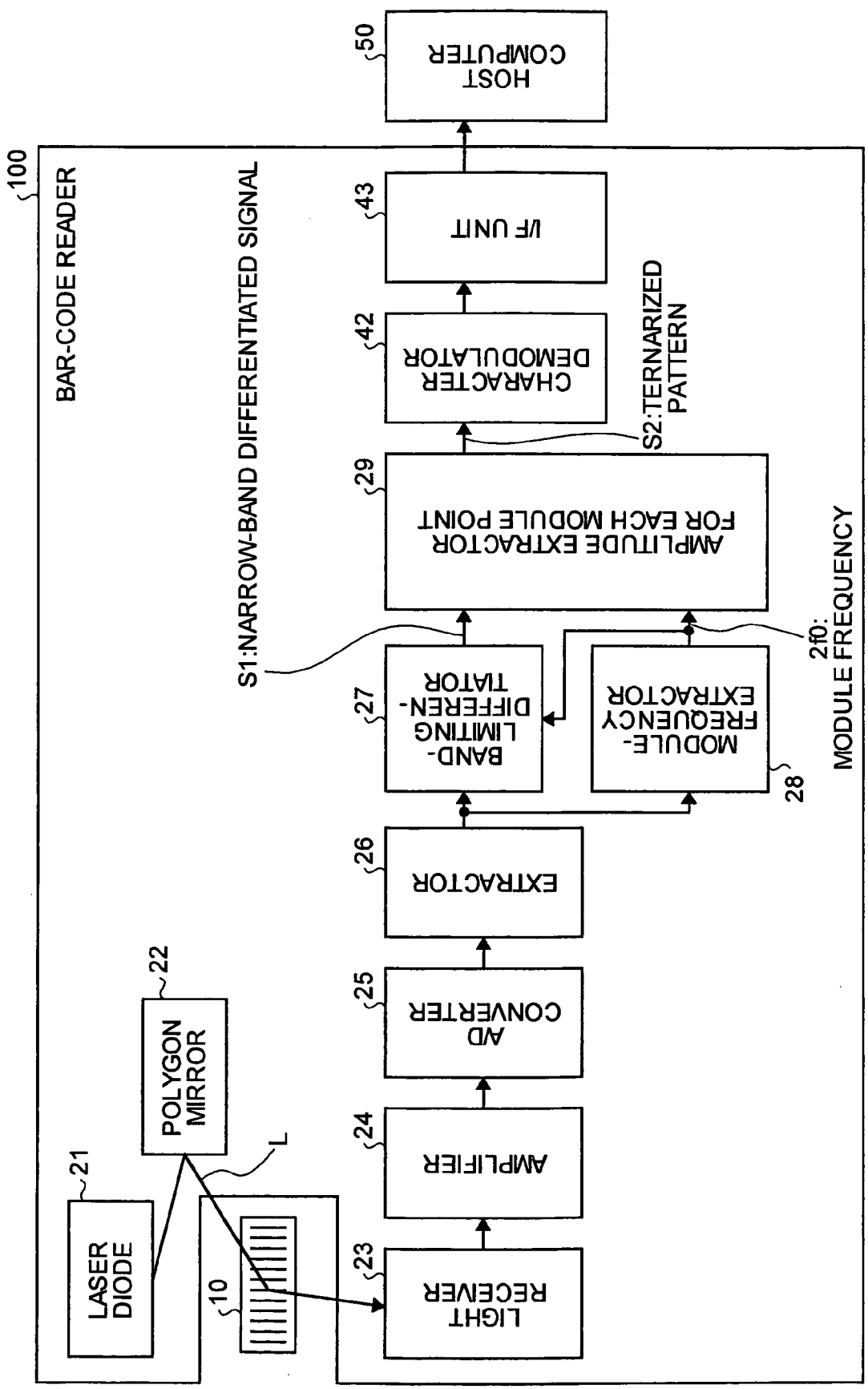
FIG. 22 is a block diagram for illustrating a conventional electrical configuration of the barcode reader 20 shown in FIG. 21.

FIG. 1 is a block diagram of a barcode reader according to an embodiment of the present invention. In FIG. 1, the same reference numerals are assigned to components corresponding to components in FIG. 22. In a barcode reader 100 shown in FIG. 1, an amplitude extractor 101 for each module point is provided instead of an amplitude extractor 29 for each module point shown in FIG. 22.

Figure 31A:
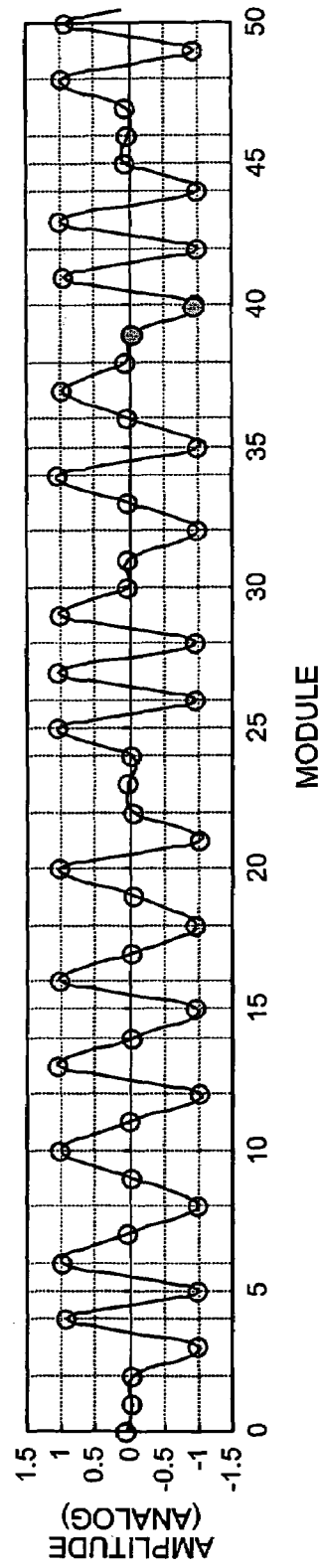
FIGS. 31A and 31B are graphs of a conventional ternarized pattern and a character pattern.

The amplitude extractor 101 for each module point, similarly as the amplitude extractor 29 for each module point (see FIG. 22), is provided with a function of outputting a ternarized pattern S2 (see FIG. 31A) with a narrow-band differential signal S1 and a module frequency 2$f$0 as input.

However, the amplitude extractor 101 for each module point, as shown in FIG. 17, has a total of an overall throughput substantially less and a processing speed improved as compared to that of the amplitude extractor 29 for each module point.

Figure 2:
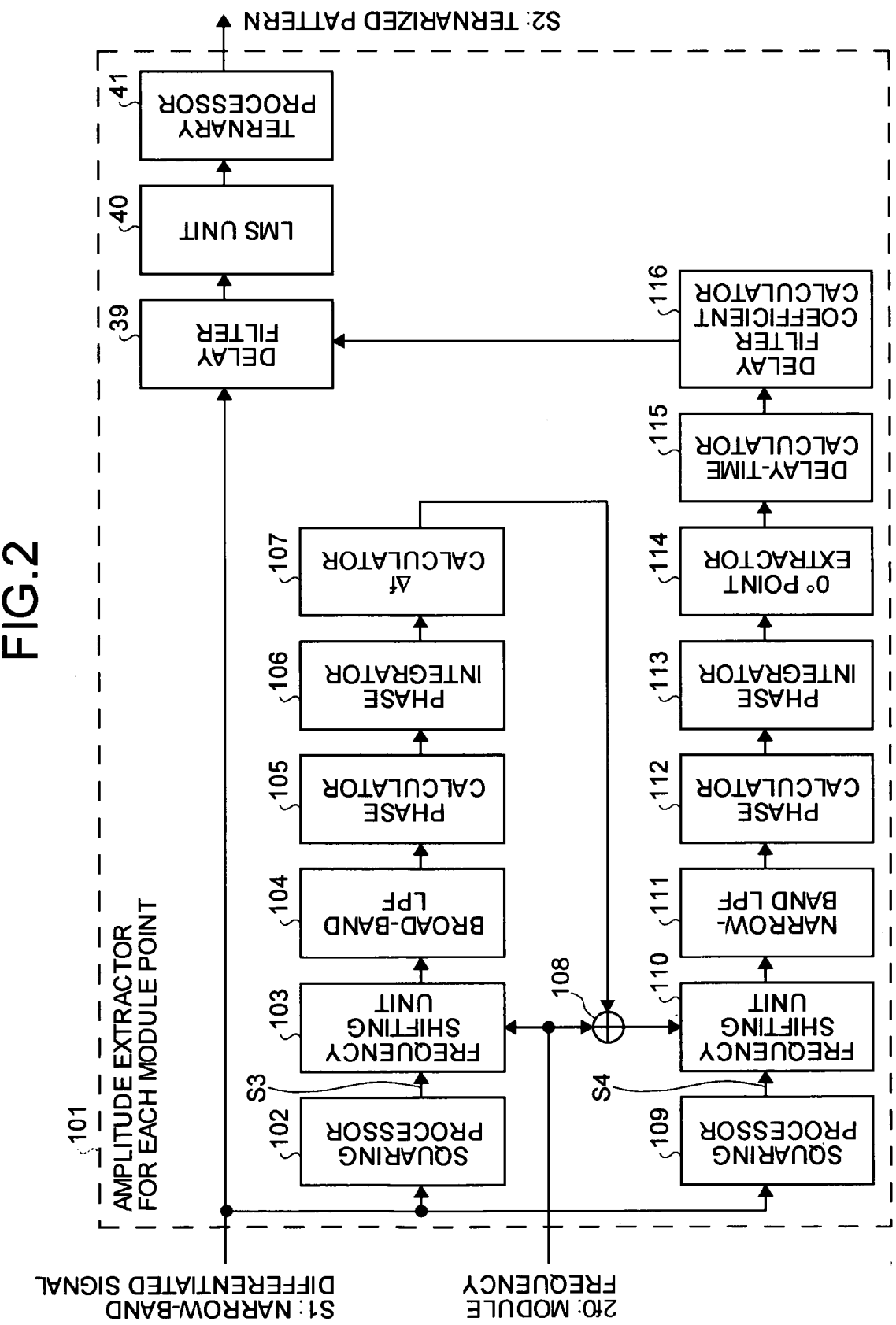
FIG. 2 is a block diagram of an amplitude extractor 101 for each module point shown in FIG. 1.
Figure 23:
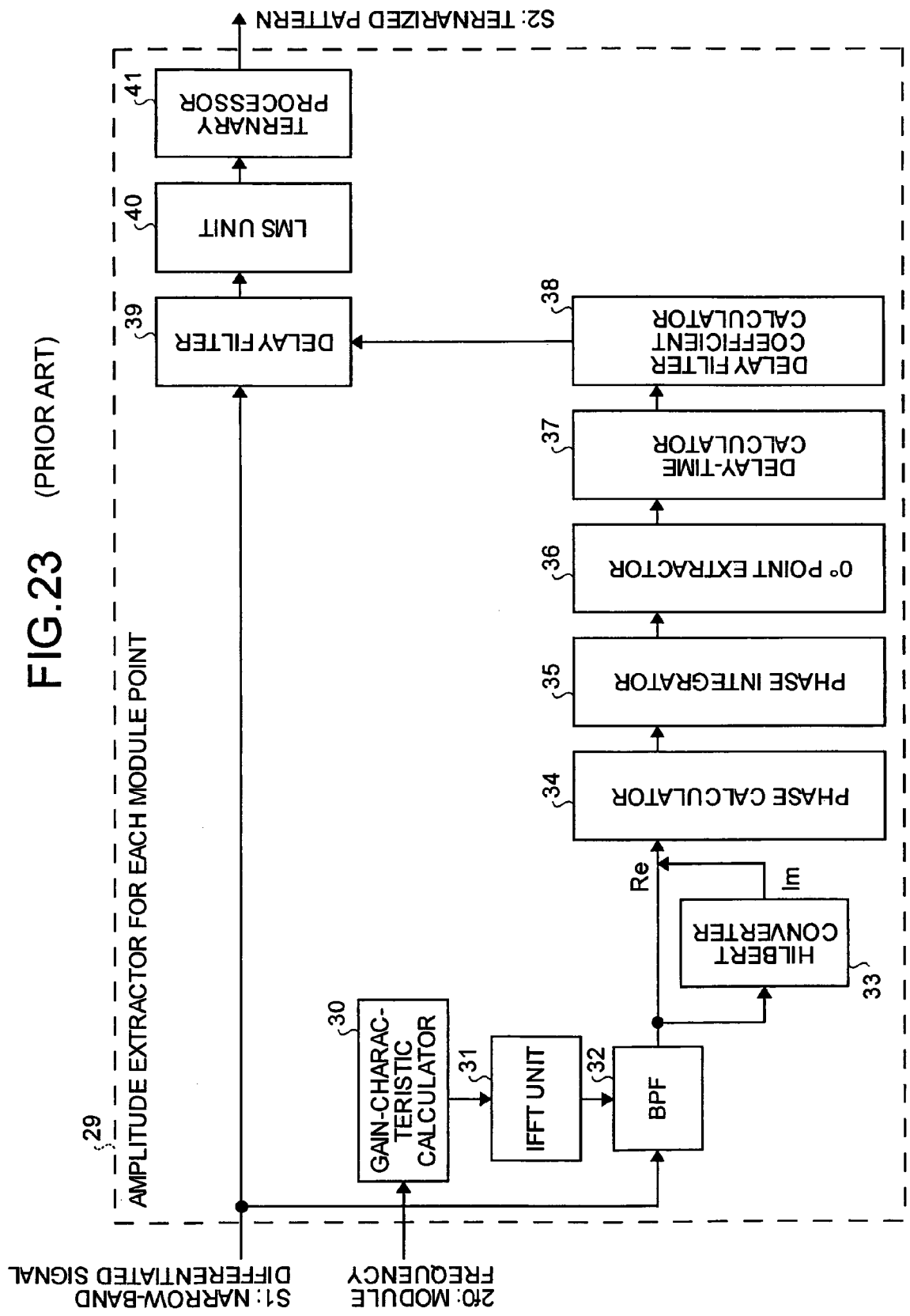
FIG. 23 is a block diagram diagram for illustrating an electrical configuration of a conventional amplitude extractor 29 for each module point shown in FIG. 22.
Figure 24:
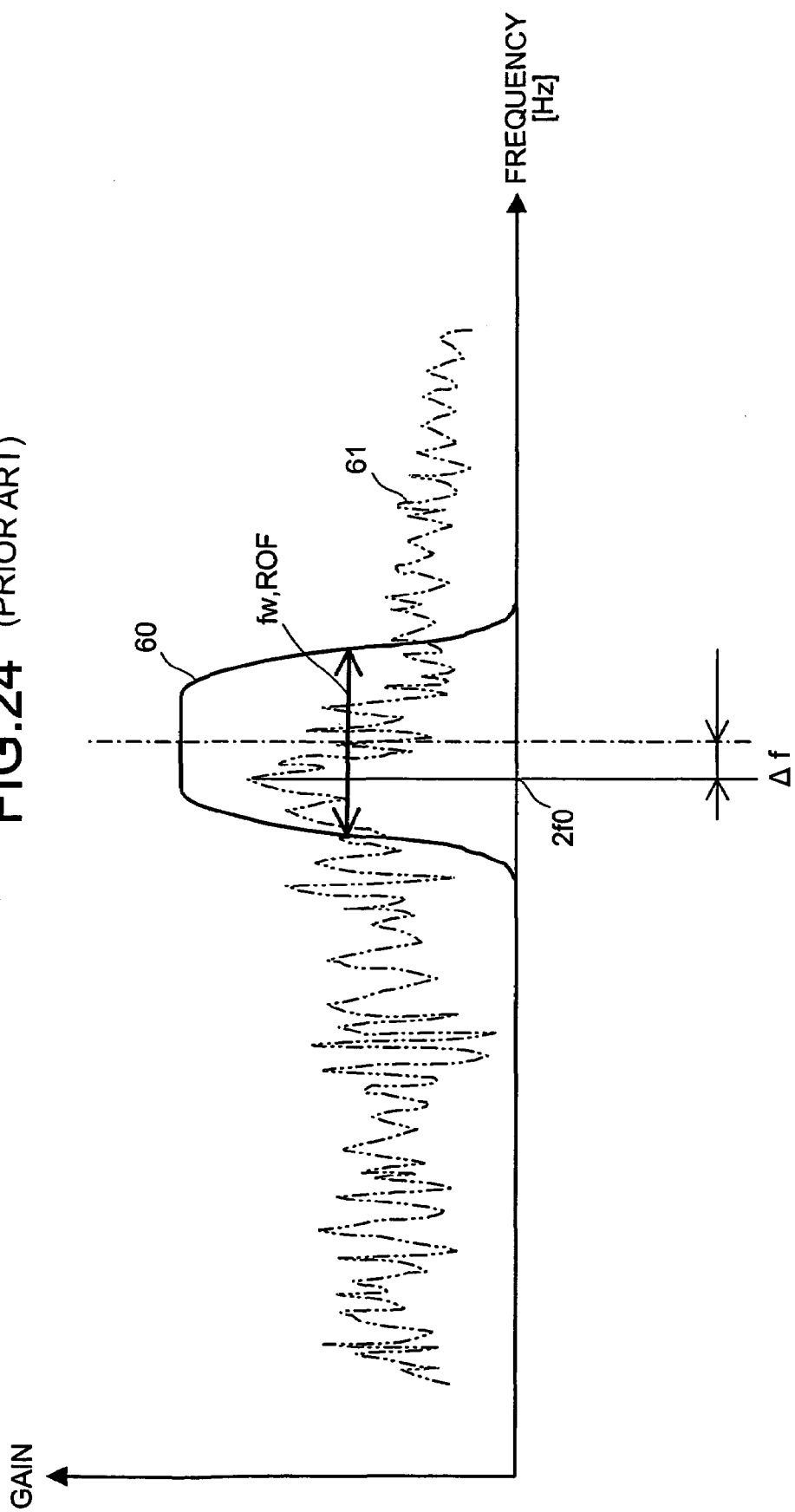
FIG. 24 is a graph of a gain characteristic of a BPF 32 shown in FIG. 23.
Figure 25:
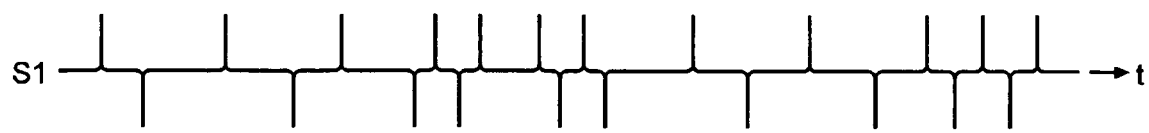
FIG. 25 is a graph of a narrow-band differential signal S1 shown in FIG. 23.

FIG. 2 is a block diagram of an amplitude extractor 101 for each module point shown in FIG. 1. In FIG. 2, the same reference numerals are assigned to components corresponding to components in FIG. 23.

Figure 7A:
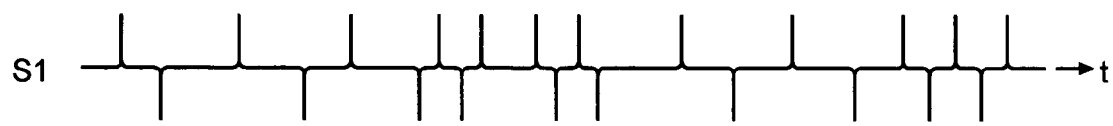
FIGS. 7A and 7B are graphs for illustrating a squared signal S3 from a squaring processor 102 and a narrow-band differential signal S1 shown in FIG. 2.
Figure 7B:

In the amplitude extractor 101 for each module point shown in FIG. 2, a squaring processor 102 performs squaring process on the narrow-band differential signal S1 shown in FIG. 7A from a band-limiting differentiator 27 (see FIG. 1) and outputs a squared signal S3 of a waveform pattern shown in FIG. 7B.

Figure 8:
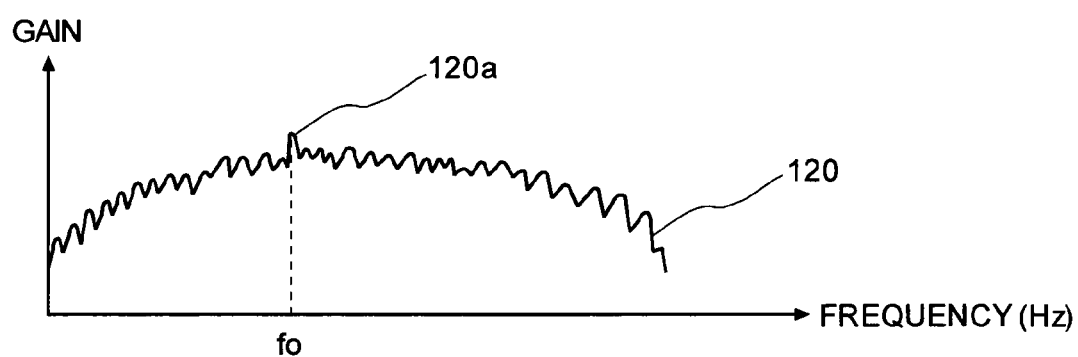
FIG. 8 is a graph of a frequency spectrum 120 of the narrow-band differential signal S1 shown in FIG. 7A.

FIG. 8 is a graph of a frequency spectrum 120 of the narrow-band differential signal S1 shown in FIG. 7A. In FIG. 8, a horizontal axis is a frequency and a vertical axis is a gain. The frequency at a peak value 120*a* of the gain is $f0$.

Figure 9:
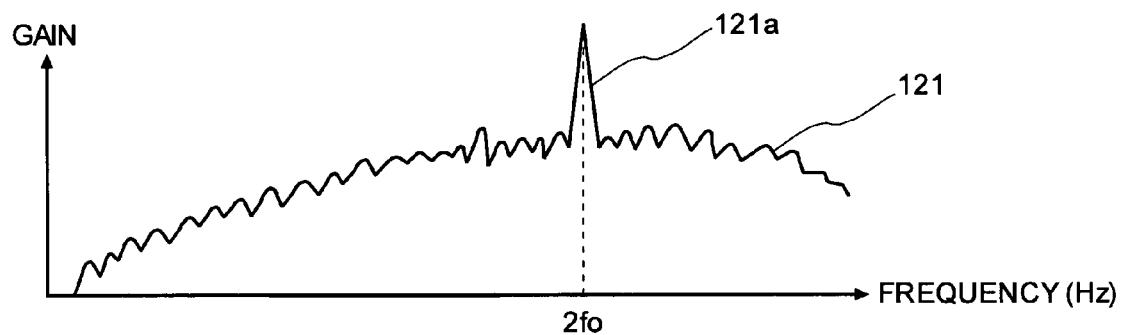
FIG. 9 is a graph of a frequency spectrum 121 of the squared signal S3 shown in FIG. 7B.

FIG. 9 is a graph of a frequency spectrum 121 of the squared signal S3 shown in FIG. 7B. In FIG. 9, the frequency at a peak value 121*a* of the gain is a module frequency 2$f$0.

Figure 10:
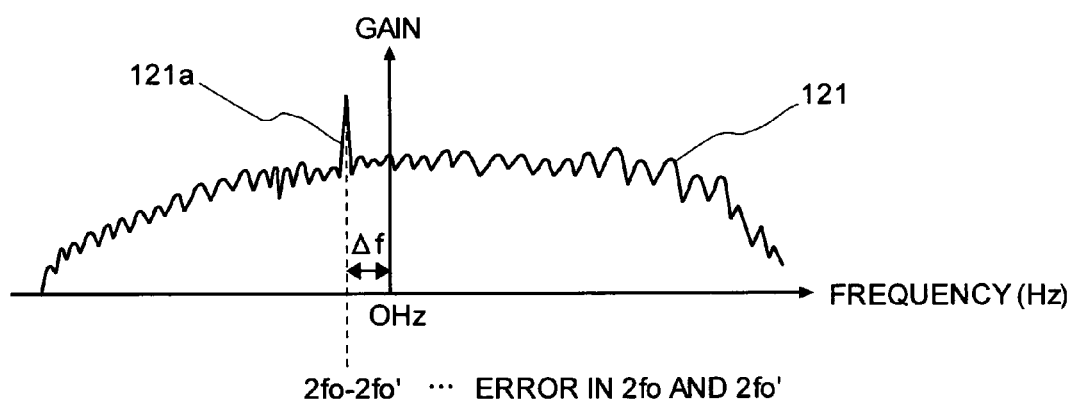
FIG. 10 is a graph for explaining an operation of the frequency shifting unit 103 shown in FIG. 2.

Referring back to FIG. 2, a frequency shifting unit 103 shifts the frequency of the peak value of the squared signal S3 such that the module frequency 2$f$0 becomes 0 Hz. Concretely, the frequency shifting unit 103 shifts the frequency spectrum 121 shown in FIG. 9 towards a left direction (0 Hz direction) on the frequency axis and makes a peak value 121*a* to be 0 Hz as shown in FIG. 10.

However, practically, since there is a noise included in the module frequency 2$f$0 that is extracted by a module-frequency extractor 28, it is difficult to make the peak value 121*a* to be exactly 0 Hz. Therefore, the frequency of the peak value 121*a* becomes a module frequency 2$f$0′ that includes a module-frequency error Δf (2$f$0–2$f$0′).

Moreover, at the frequency shifting unit 103, since there is a shift in a frequency of a scalar amount of the squared signal S3, an output signal is vectorized (real part Re and imaginary part Im) as shown in FIG. 3.

FIG. 3 is a schematic diagram of a frequency shifting unit 103 shown in FIG. 2. In FIG. 3, the frequency shifting unit 103 is provided with a multiplier 103*a* and a multiplier 103*b*.

The multiplier 103*a* multiplies the squared signal S3 by cos θ and lets it to be a real part Re. On the other hand, the multiplier 103b multiplies the squared signal S3 by −sin θ and lets it to be an imaginary part Im. Thus, an output signal of the frequency shifting unit 103 is vectorized by the real part Re and the imaginary part Im.

Here, θ in cos θ and −sin θ is calculated from the module frequency 2f0. For example, if the frequency shifting unit 103 operates at a sampling rate of 2.5 MHz and if the module frequency 2f0 is 0.8 MHz, the frequency is shifted by −0.8 MHz.

In this case, θ rotates for each −115.2° (=(−0.8 MHz/2.5 MHz)×360°) at one sample unit. Therefore, at the frequency shifting unit 103, based on θ shown in FIG. 4, cos θ and −sin θ are multiplied by the squared signal S3 for each sample.

Figure 11:
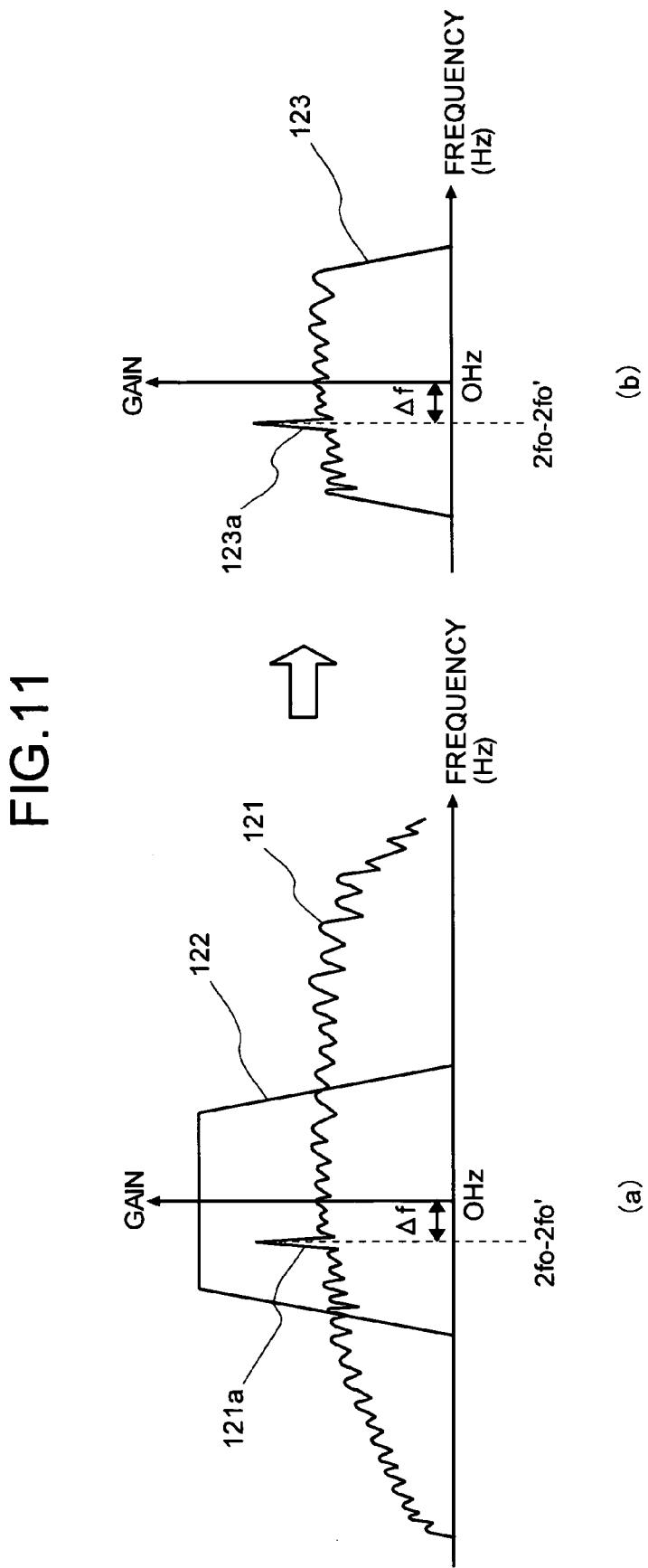
FIGS. 11A and 11B are graphs for explaining an operation of the broad-band LPF 104 shown in FIG. 2.

A broad-band low pass filter (LPF) is a filter that allows from the output signal (the frequency spectrum 121: see FIG. 11A) of the frequency shifting unit 103, a low frequency component 123 shown in FIG. 11B with a gain characteristic 122 shown in FIG. 11A, to pass.

According to the present embodiment, since the squared signal S3 (frequency spectrum 121) is shifted near 0 Hz in the frequency shifting unit 103, a low pass filter (broad-band LPF 104) that allows only the low frequency component to pass, may be suitable.

Figure 14:
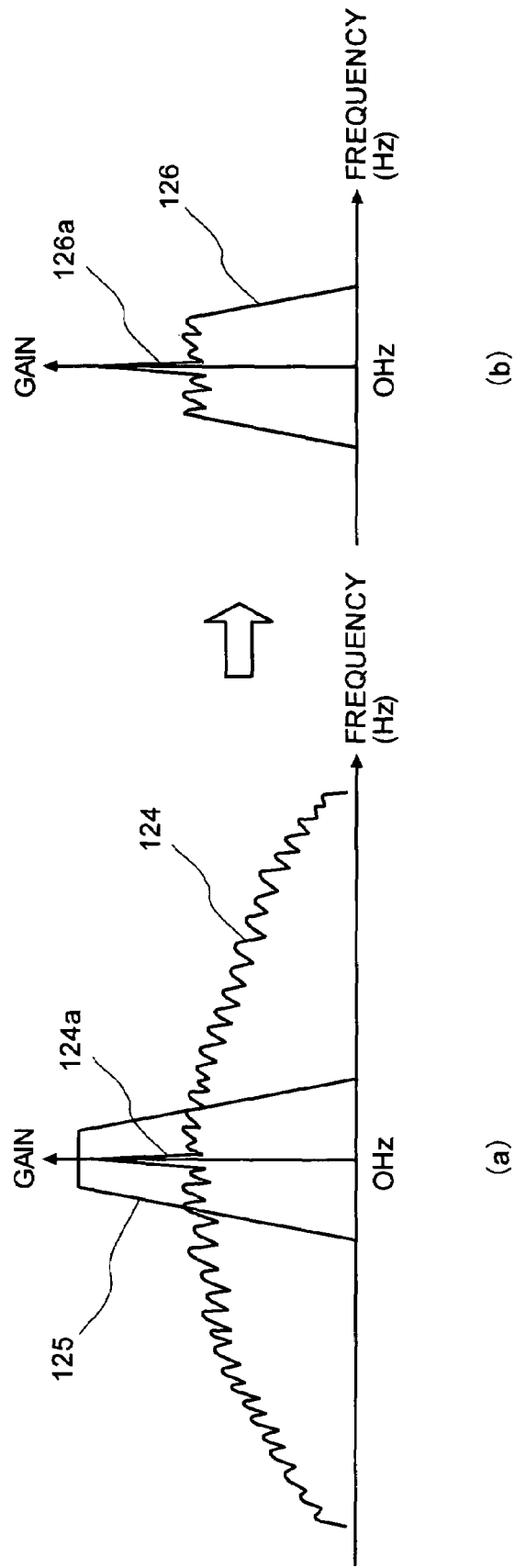
FIGS. 14A and 14B are graphs for explaining an operation of the narrow-band LPF 111 shown in FIG. 2.

Moreover, the gain characteristic 122 of the broad-band LPF 104 is a broad band as compared to a gain characteristic 124 of a narrow-band LPF 111 (see FIG. 14A). This, as shown in FIG. 11A, is for covering fluctuation due to the module-frequency error Δf, as the module-frequency error Δf is included in the frequency spectrum 121 (squared signal S3) after the shift in frequency.

Figure 5:
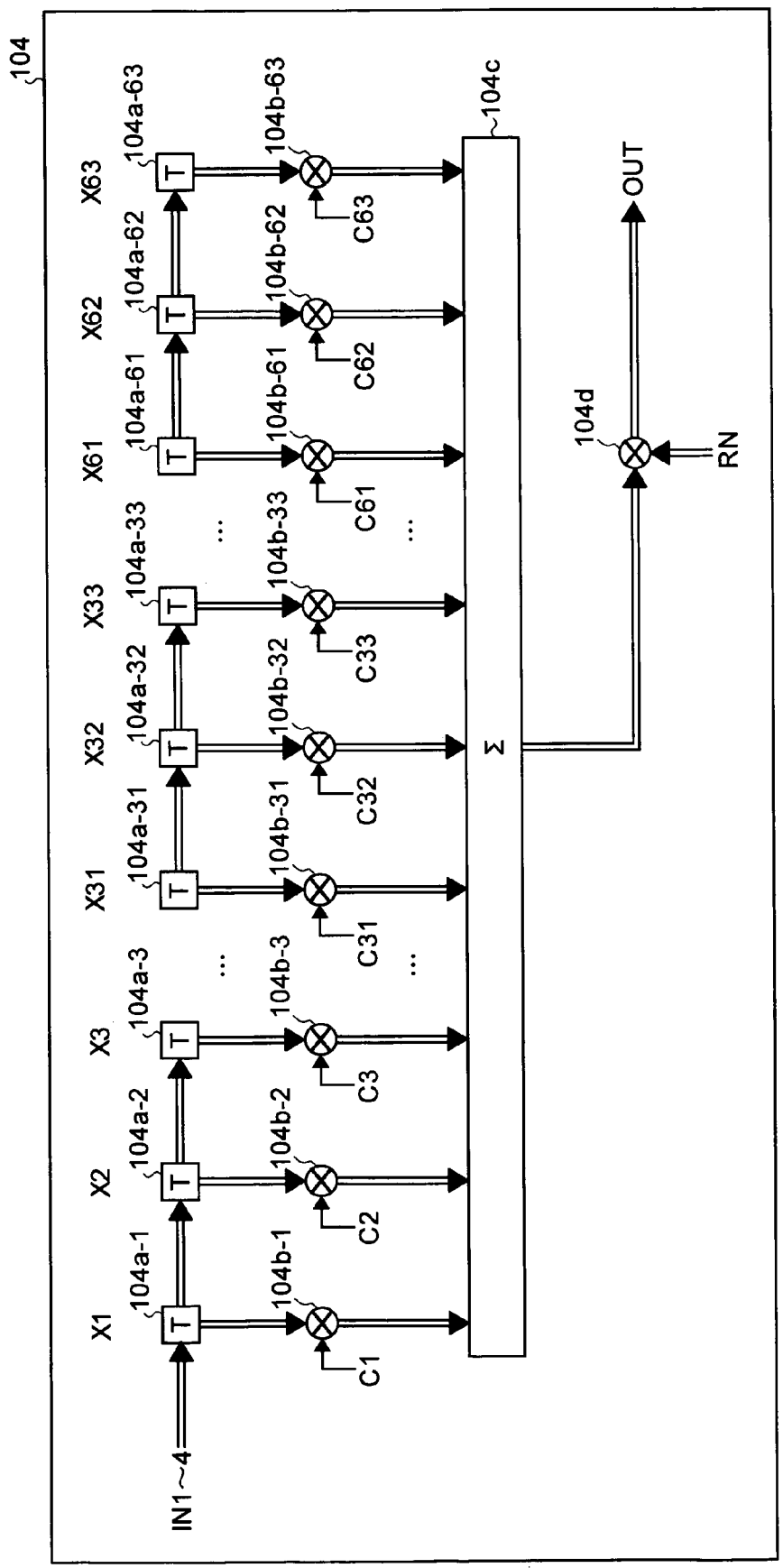
FIG. 5 is a schematic diagram of a broad-band LPF 104 shown in FIG. 2.

Practically, the broad-band LPF 104, as shown in FIG. 5, is a digital filter that sets gain characteristics by setting tap coefficients C1 to C63, and includes delay units 104a-1 to 104a-63, multipliers 104b-1 to 104b-63, a summing adder 104c, and a multiplier 104d. X1 to X63 are digital data of sampling with 64 samplings of the output signal from the frequency shifting unit 103.

Moreover, a decimation factor (for example, ¼) is set in advance in the broad-band LPF 104. The decimation factor is a proportion that thins out a throughput. Therefore, when the decimation factor is ¼, the throughput is ¼.

Referring back to FIG. 2, a phase calculating unit 105 calculates a phase (−180° to +180°) of an output (vector signal) of the broad-band LPF 104.

For example, when the module-frequency error Δf (2f0–2f0') is −10 kHz, the sampling rate is 2.5 MHz, the phase is calculated as −1.44° ((−10 kHz/2.5 MHz)×360°).

Figures 12, 13:
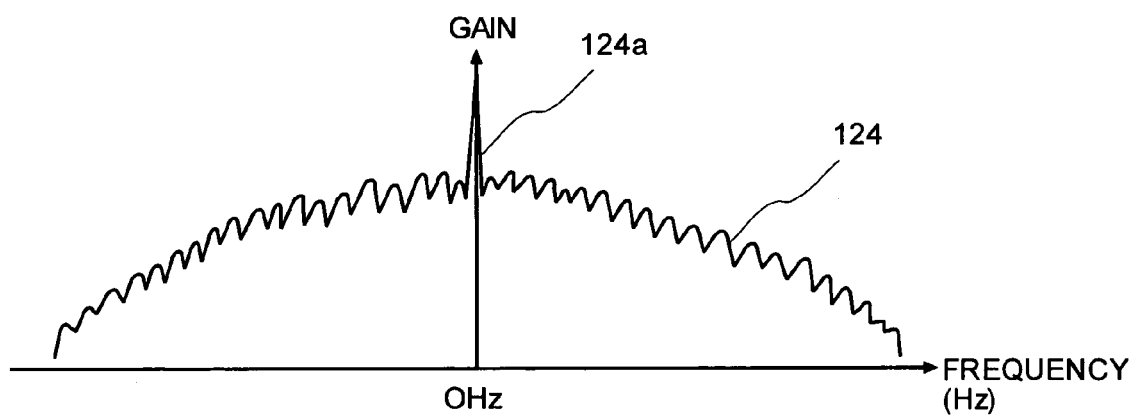
FIG. 12 is a table for explaining an operation of a phase integrator 106 shown in FIG. 2.
FIG. 13 is a graph for explaining an operation of a frequency shifting unit 110 shown in FIG. 2.

A phase integrator 106, as shown in FIG. 12, integrates in units of sample the phase (in this case, −1.44°) that is calculated in the phase calculating unit 105. A Δf calculating unit 107 calculates a module-frequency error Δf (2f0–2f0') from a result of integration by the phase integrator 106 and the number of samplings.

For example, when the number of samplings is 100 and the result of integration is −145°, an angle per sampling is −1.45° (−145/100). When this angle is converted to frequency, the module-frequency error Δf becomes −10.06944 . . . Hz ((−1.45°/360°)×2.5 MHz).

An adder 108, adds the module frequency 2f0 (since the error is included, hereinafter, "module frequency 2f0'") from the module-frequency extractor 28 (see FIG. 1) and the module-frequency error Δf from the Δf calculating unit 107. Therefore, a result of addition of the adder 108 becomes 2f0'+Δf.

A squaring processor 109 performs a squaring process on the narrow-band differential signal S1 shown in FIG. 7A from the band-limiting differentiator 27 (see FIG. 1) and outputs a squared signal S4 similar to the waveform pattern shown in FIG. 7B.

A frequency shifting unit 110, as shown in FIG. 13, shifts only a part (2f0'+Δf) from the adder 108 of a frequency spectrum 124 corresponding to the squared signal S4. Due to this, a peak value 124a of the frequency spectrum 124 becomes almost 0 Hz (2f0−(2f0'+Δf)≈0).

Moreover, in the frequency shifting unit 110, since a scalar quantity of the squared signal S4 is subjected to the shift in frequency, an output signal is vectorized.

The narrow-band LPF 111 is a filter that allows from the output signal (the frequency spectrum 124: see FIG. 13) of the frequency shifting unit 110, a low frequency component 126 shown in FIG. 14B with a gain characteristic 125 shown in FIG. 14A, to pass. A peak value 126a of this low frequency component 126 corresponds almost to 0 Hz.

According to the present embodiment, since the squared signal S4 (frequency spectrum 124) is shifted to almost 0 Hz (low) in the frequency shifting unit 110, a low pass filter (narrow-band LPF 111) that allows only the low frequency component to pass, may be suitable.

Moreover, the gain characteristic 125 of the narrow-band LPF 111 (FIG. 12(a)) is a narrow band as compared to the gain characteristic 122 of the broad-band LPF 104 (see FIG. 11A) mentioned above.

This is because there is almost no fluctuation due to the module-frequency error Δf as an accurate module-frequency error Δf is calculated at the Δf calculating unit 107 and the peak value of the frequency spectrum 124 (squared signal S4) after the shift in frequency is let to be almost 0 Hz.

Figure 6:
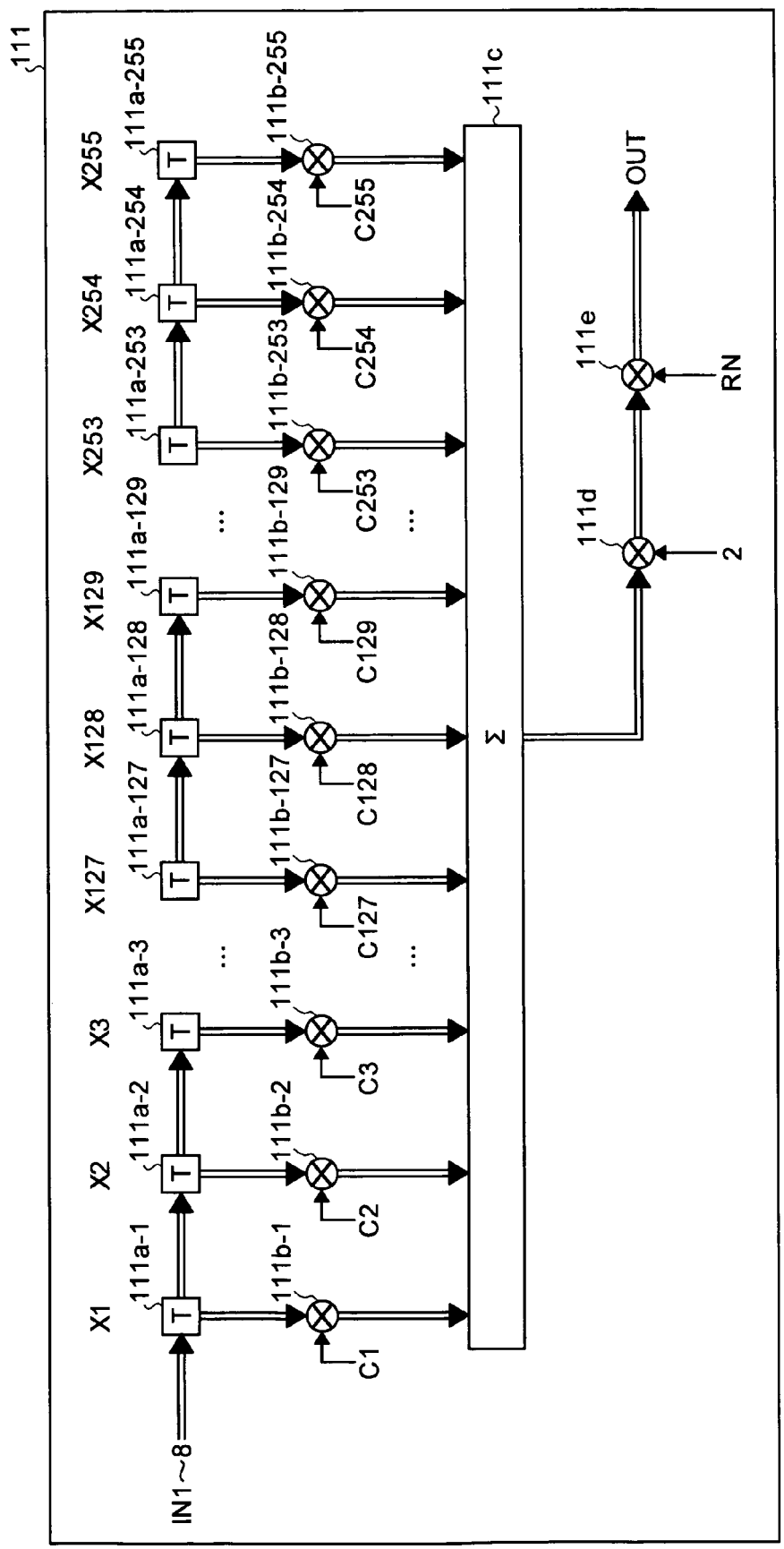
FIG. 6 is a schematic diagram of a narrow-band LPF 111 shown in FIG. 2.

Practically, the narrow-band LPF 111, as shown in FIG. 6 is a digital filter that sets gain characteristics by setting the tap coefficients C1 to C63, and includes delay units 111a-1 to 111a-255, multipliers 111b-1 to 111b-255, a summing adder 111c, a multiplier 111d, and an adder 111e. X1 to X255 are digital data of sampling with 255 samplings of the output signal from the frequency shifting unit 110.

Moreover, a decimation factor (for example, ⅛) is set in advance in the narrow-band LPF 111 similarly as in the broad-band LPF 104. The decimation factor is a proportion that thins out the throughput. Therefore, when the decimation factor is ⅛, the throughput is ⅛.

Here, the decimation factor of the narrow-band LPF 111, as compared to that of the broad-band LPF 140, can be set to be lower since the band is narrow.

Referring back to FIG. 2, a phase calculating unit 112, similarly as the phase calculating unit 105, calculates a phase (−180° to +180°) of an output (vector signal) of the narrow-band LPF 111.

A phase integrator 113, similarly as the phase integrator 106, integrates in units of samples the phase that is calculated by the phase calculating unit 112 as shown in FIG. 12. However, in the phase integrator 113, the throughput that is thinned out in the narrow-band LPF 111 is interpolated and the sampling rate is let to be sampling data same as the input of the narrow-band LPF 111.

Figure 15:
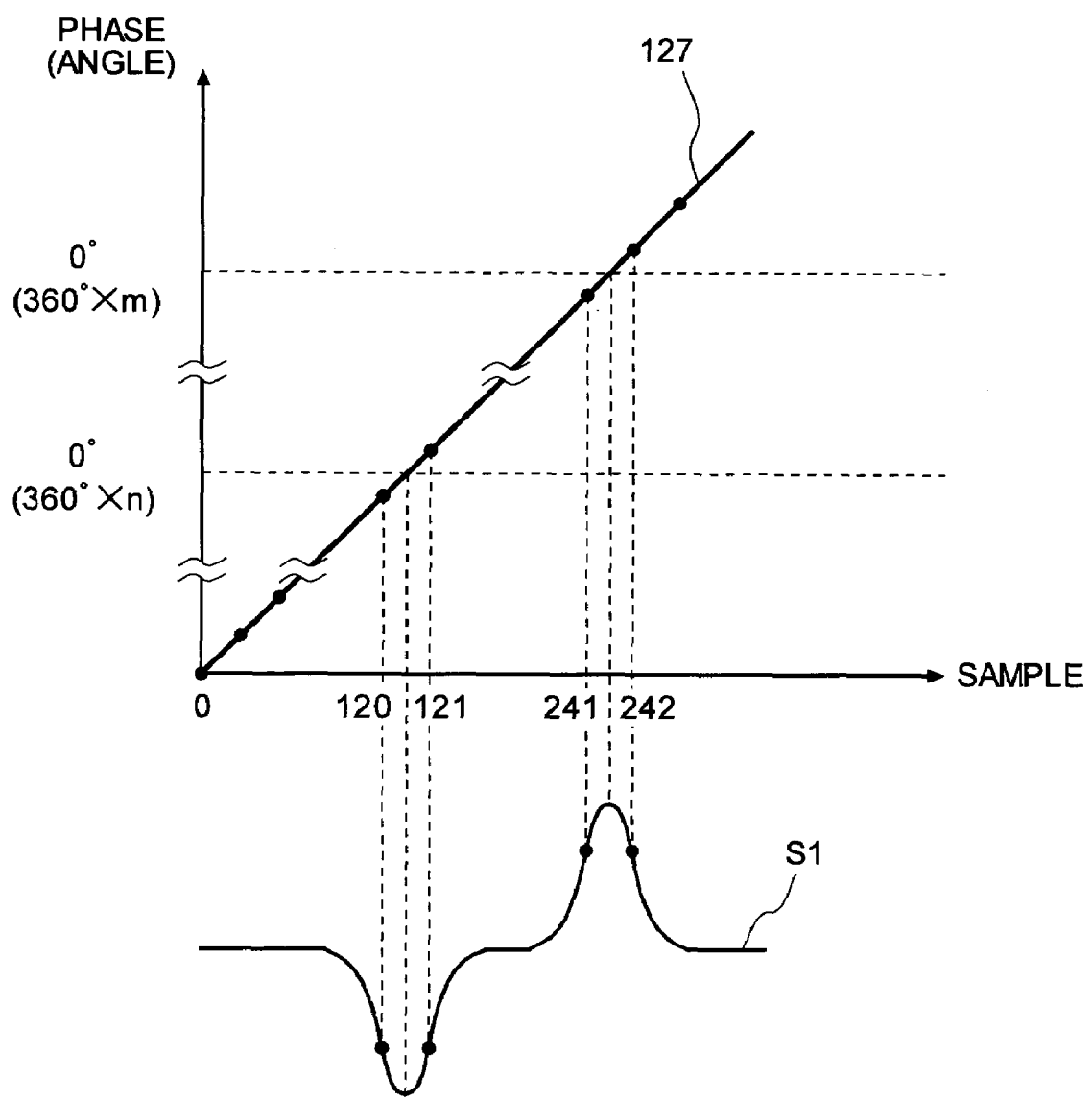
FIG. 15 is a graph for explaining an operation of a zero-degree point extractor 114 shown in FIG. 2.

A zero-degree point extractor 114, as shown in FIG. 15, detects a point where an integration result 127 has crossed 0° (360°), and extracts a point where it becomes exactly 0° (360°), as a sample point.

In an example shown in FIG. 15, if it is let to be 357° at 120th sample and 361° at 121st sample, a 120.75th sample is 0° (360°). This 0° sample point corresponds to an extremely big point or an extremely small point in the narrow-band differential signal S1.

Figure 26:
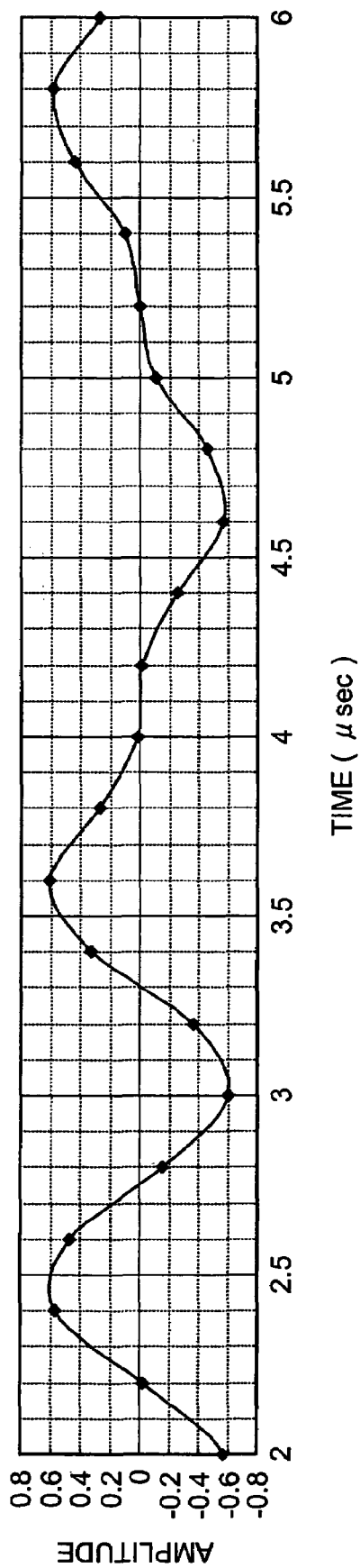
FIG. 26 is a graph a concrete waveform of the narrow-band differential signal S1 shown in FIG. 23.
Figure 27:
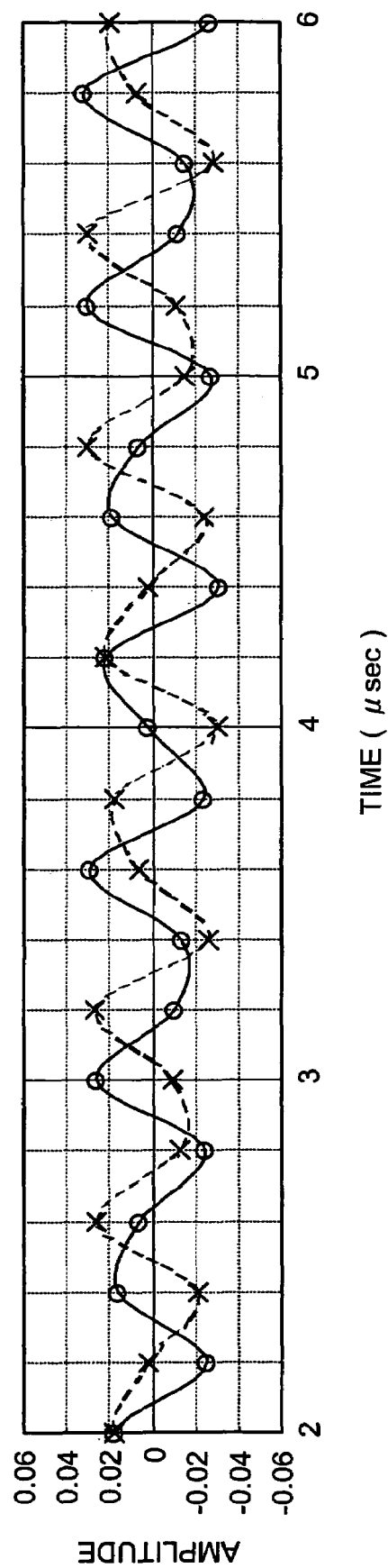
FIG. 27 is a graph of an output of the BPF 32 shown in FIG. 23.
Figure 28:
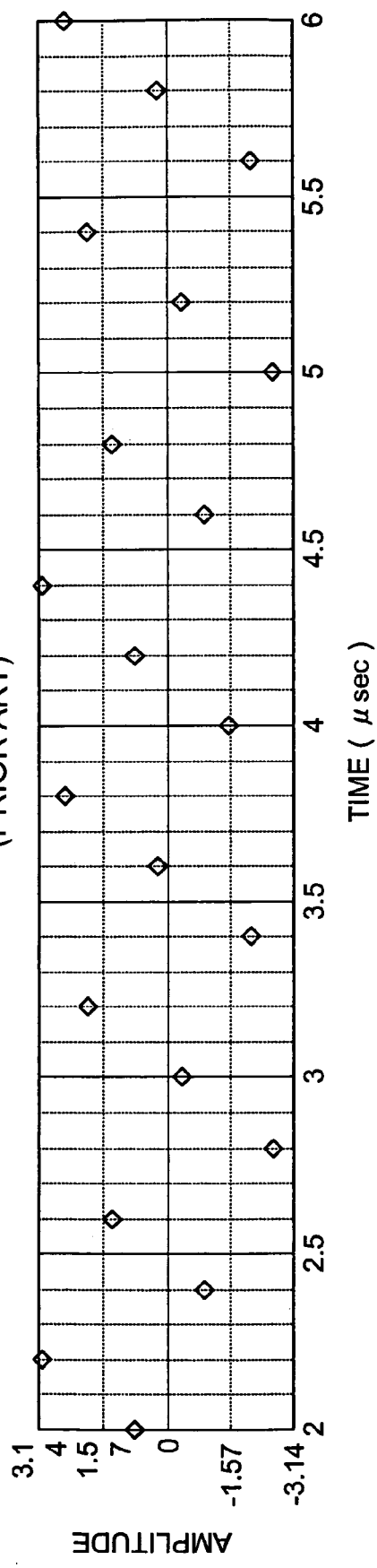
FIG. 28 is a graph of an output of a zero-degree point extractor 36 shown in FIG. 23.

A delay-time calculating unit 115, similarly as a delay-time calculating unit 37 (see FIG. 23), calculates a delay time between the sample point and a point that becomes 0° in FIG. 26.

A delay-filter-coefficient calculating unit 116, based on the delay time calculated by the delay-time calculating unit 115, calculates a delay filter coefficient and sets it in a delay filter 39.

Next, an operation according to the present embodiment is described. In FIG. 1, when a barcode 10 is held to a light beam L, at a light receiver 23, a reflected light from the barcode 10 is received, and photoelectric conversion of an electric signal of an amplitude value according to intensity of the reflected light is performed. A photoelectric signal upon amplification at an amplifier 24, is converted to a digital signal at an A/D converter 25, and is extracted at an extractor 26.

By this, the module-frequency extractor 28 performs a differentiation process and a squaring process on an output signal of the extractor 26, a frequency spectrum is obtained by an FFT process on a differentiated and squared signal, and frequency of a gain peak of this frequency spectrum is calculated as a module frequency 2f0 that is equivalent to a basic module of the barcode.

Moreover, the band-limiting differentiator 27, by using the module frequency 2f0 mentioned above, performs a differentiation process for limiting a band of the output signal of the extractor 26 and outputs the narrow-band differential signal S1 (see FIG. 7A) to the amplitude extractor 101 for each module point shown in FIG. 2.

The squaring processor 102 performs the squaring process on the narrow-band differential signal S1 shown in FIG. 7A and outputs the squared signal S3 of the waveform pattern shown in FIG. 7B. Further, the frequency shifting unit 103 shifts frequency of a peak value of the squared signal S3 such that the module frequency 2f0 becomes 0 Hz.

However, since there is an error that is mentioned above, the frequency of the peak value 121a shown in FIG. 11A is let to be a module frequency that includes the module-frequency error Δf (2f0−2f0').

Next, the broad-band LPF 104 allows from the frequency spectrum 121 shown in FIG. 11A, the low frequency component 123 shown in. FIG. 11B with the gain characteristics 122, to pass.

Further, the phase calculating unit 105 calculates the phase of the output (vector signal) of the broad-band LPF 104. The phase integrator 106, as shown in FIG. 12, integrates in units of samples the phase (in this case, −1.44°) that is calculated in the phase calculating unit 105.

Further, the Δf calculating unit 107 calculates the module-frequency error Δf (2f0−2f0') from the result of the integration by the phase integrator 106.

By this, the adder 108 calculates the module frequency 2f0' from the module-frequency extractor 28 (see FIG. 1) and the module-frequency error Δf from the Δf calculating unit 107.

The squaring processor 109 performs the squaring process on the narrow-band differential signal S1 shown in FIG. 7A and outputs the squared signal S4 similar to the waveform pattern shown in FIG. 7B.

Next, the frequency shifting unit 110, as shown in FIG. 13, shifts only the part (2f0'+Δf) from the adder 108 of the frequency spectrum 124 corresponding to the squared signal S4 and brings the peak value 124a of the frequency spectrum 124 to a position of almost 0 Hz (2f0−(82f0'+Δf)=0).

Further, the narrow band LPF 111 allows from the frequency spectrum 124 shown in FIG. 13, the low frequency component 126 shown in FIG. 14B with the gain characteristic 125 shown in FIG. 14A, to pass.

Next, the phase calculating unit 112 calculates the phase of (−180° to +180°) of the output (vector signal) of the narrow-band LPF 111, and the phase integrator 113 integrates in units of samples the phase that is calculated by the phase calculating unit 112.

Further, the zero-degree point extractor 114, as shown in FIG. 15, detects the point where the integration result 127 has crossed 0° (360°), and extracts the point where it becomes exactly 0° (360°), as a sample point.

Figure 16:
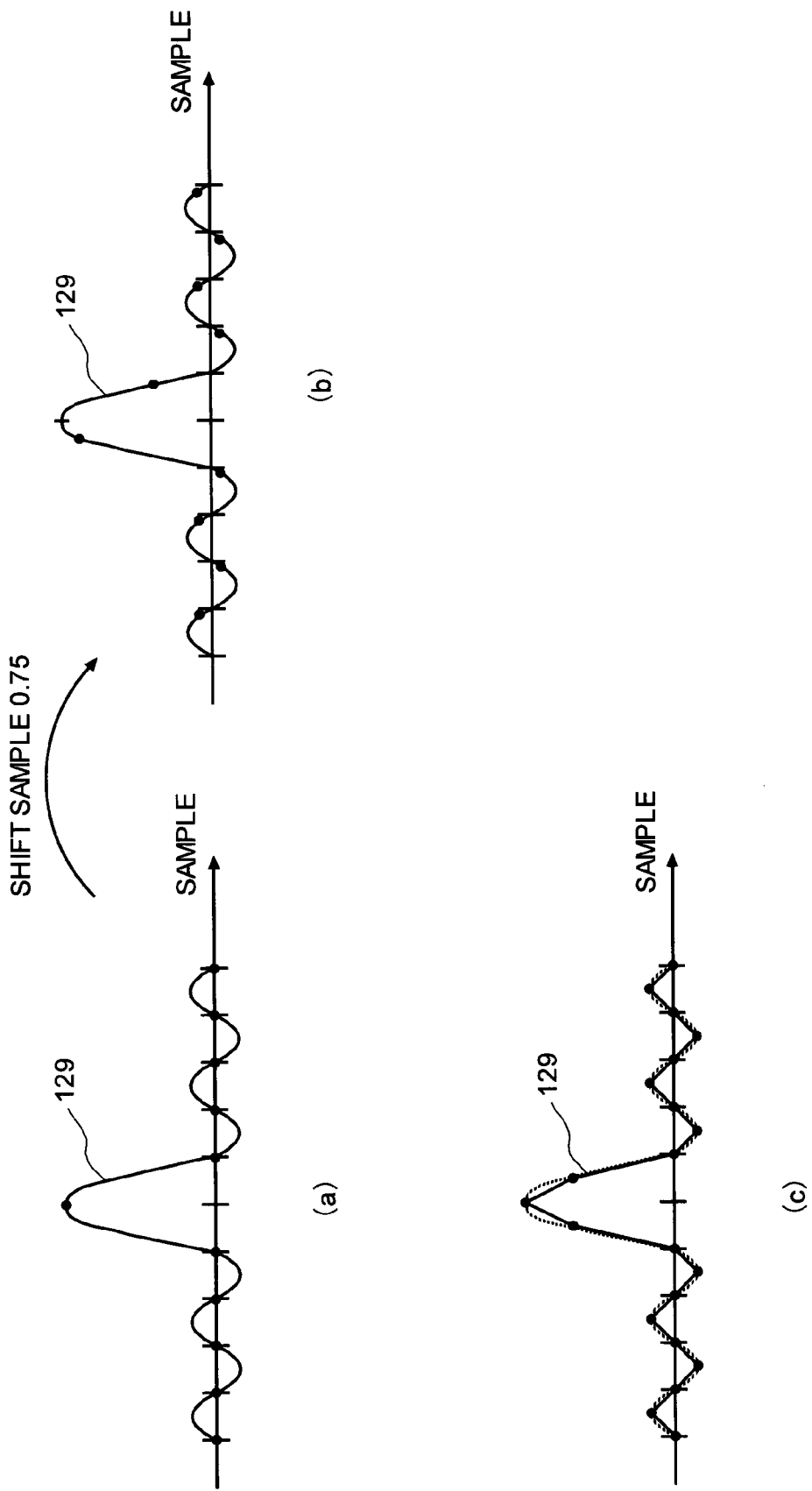
FIGS. 16A to 16C are graphs for explaining an operation of a delay-filter-coefficient calculating unit 116 shown in FIG. 2.

Next, the delay-time calculating unit 115, similarly as the delay-time calculating unit 37 (see FIG. 23), calculates the delay time between the sample point and the point that becomes 0° in FIG. 26 like a waveform 129 shown in FIG. 16A and FIG. 16B. In FIG. 16(c), a waveform (solid line) in which the waveform 129 is approximated in the linear function is shown.

Further, the delay-filter-coefficient calculating unit 116, based on the delay time calculated by the delay-time calculating unit 115, calculates the delay filter coefficient and sets it in the delay filter 39.

Figure 29:
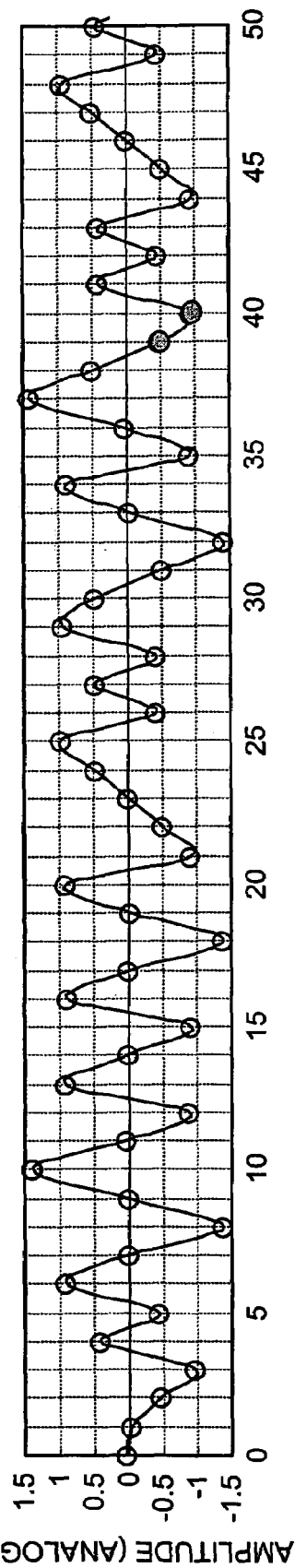
FIG. 29 is a graph of an output of a delay filter 39 shown in FIG. 23.

Next, the delay filter 39, based on the delay filter coefficient corresponding to the delay time, performs a delaying process on the narrow-band differential signal S1, allows the sample point 0° to coincide with the timing point (see FIG. 16B), and for example, outputs a wave pattern shown in FIG. 29 to an LMS unit 40.

Figure 30:
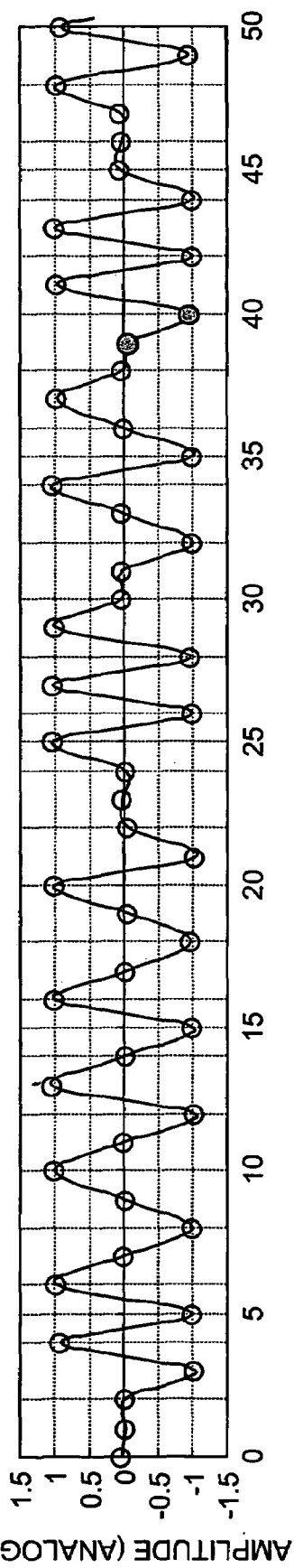
FIG. 30 is a graph of an output of an LMS unit 40 shown in FIG. 23.

By doing so, the LMS unit 40 performs an equalization process on an output signal from the delay filter 39 by a method of least squares. A ternary processor 41, based on a comparison of amplitude and a threshold value, ternarizes an output of the LMS unit 40 (see FIG. 30) to any one of "+1", "0", and "−1", and outputs a ternarized pattern shown in FIG. 31A to a character demodulator 42 shown in FIG. 1.

Figure 31B:
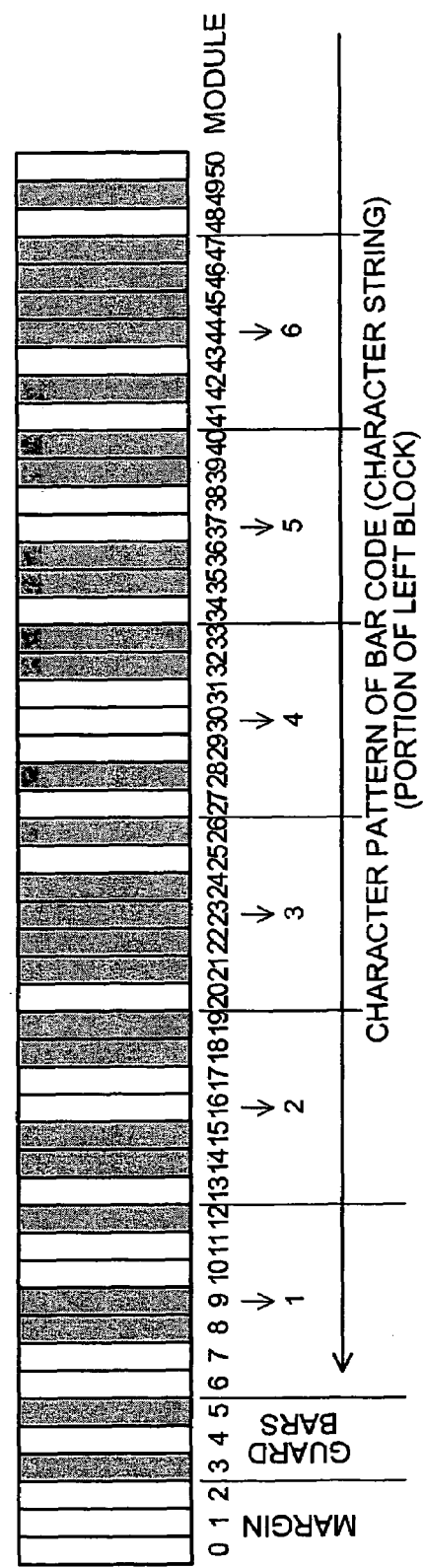

The character demodulator 42, based on the ternarized pattern, demodulates a character pattern (character string) of the barcode shown in FIG. 31B. This character pattern is transmitted as a reading result from an I/F unit 43 to a host computer 50.

As described above, according to the present embodiment, regarding the squared signal S4 corresponding to the barcode 10, since in the frequency shifting unit 110, the low frequency component that is included in the output signal with the frequency shifted to 0 Hz based on the module frequency, is allowed to pass by the narrow-band LPF 111, based on the module frequency that is let to be extracted and the output signal from narrow-band LPF 111, a module point that is synchronized with the squared signal S4 (narrow-band differential signal S1) and that has a module frequency is let to be extracted, and the character of the barcode 10 is let to be demodulated, as compared to a configuration in which a conventional BPF 32 (see FIG. 23), the throughput can be reduced and the processing speed can be improved.

Moreover, according to the present embodiment, since the broad-band LPF 104 and the narrow-band LPF 111 are let to be digital filters and the decimation for thinning out the throughput is let to be set, the processing speed can be improved further.

Moreover, according to the present embodiment, since the module-frequency error Δf is let to be calculated by the squaring processor 102, the frequency shifting unit 103, the broad-band LPF 104, the phase calculating unit 105, the phase integrator 106, and the Δf calculating unit, and the error is let to be corrected while the frequency is shifted in the frequency shifting unit 110, it is possible to improve accuracy of reading of the barcode 10.

Furthermore, according to the present embodiment, since the output signal that is vectorized by the frequency shifting unit 103 and the frequency shifting unit 110 is let to be generated, as compared to a case of a conventional Hilbert converter 33 (see FIG. 23), the throughput can be reduced and the processing speed can be improved.

In FIG. 17, information of comparing a total of the overall throughput in a case of a conventional barcode reader 20, in a case of a configuration with only basic units of the barcode reader 100 (squaring processor 109, frequency shifting unit 110, narrow-band LPF 111, phase calculating unit 112, phase integrator 113, zero-degree point extractor 114, delay-time calculating unit 115, and delay-filter-coefficient calculating unit 116), and in a case of including units for calculating the module-frequency error Δf of the barcode reader 100 (squaring processor 102, frequency shifting unit 103, broad-band LPF 104, phase calculating unit 105, phase integrator 106, Δf calculating unit 107, and adder 108) is shown.

According to FIG. 17, the total of the overall throughput of the conventional barcode reader 20 is 291157 (for details, see FIG. 32), whereas the same total for basic units of the barcode reader 100 is 69387 (for details, see FIG. 18), and the same total for that including units for calculating the module-frequency error Δf is 133260 (for details, see FIG. 19) and it can be seen that there is a substantial decrease in the overall throughput and a dramatic improvement in the processing speed.

Although the present embodiment has been described above by referring to the diagrams, a concrete example of configuration is not restricted to the present embodiment and a design modification etc. within a scope that is not deviated from the basic idea of the present invention is included in the present invention.

Figure 20:
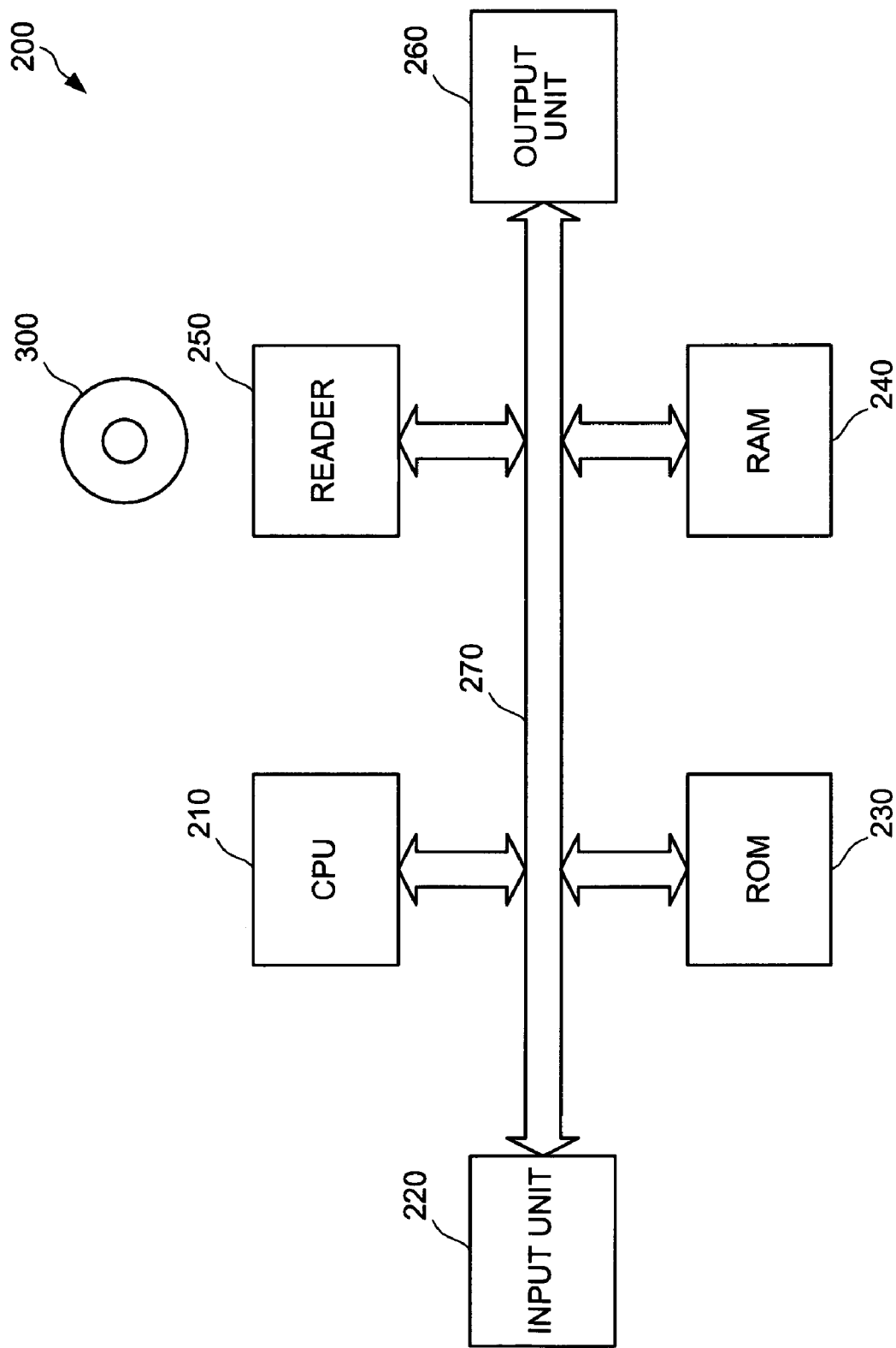
FIG. 20 is a schematic diagram for illustrating a configuration of a modified example of the present embodiment.
Figure 21:
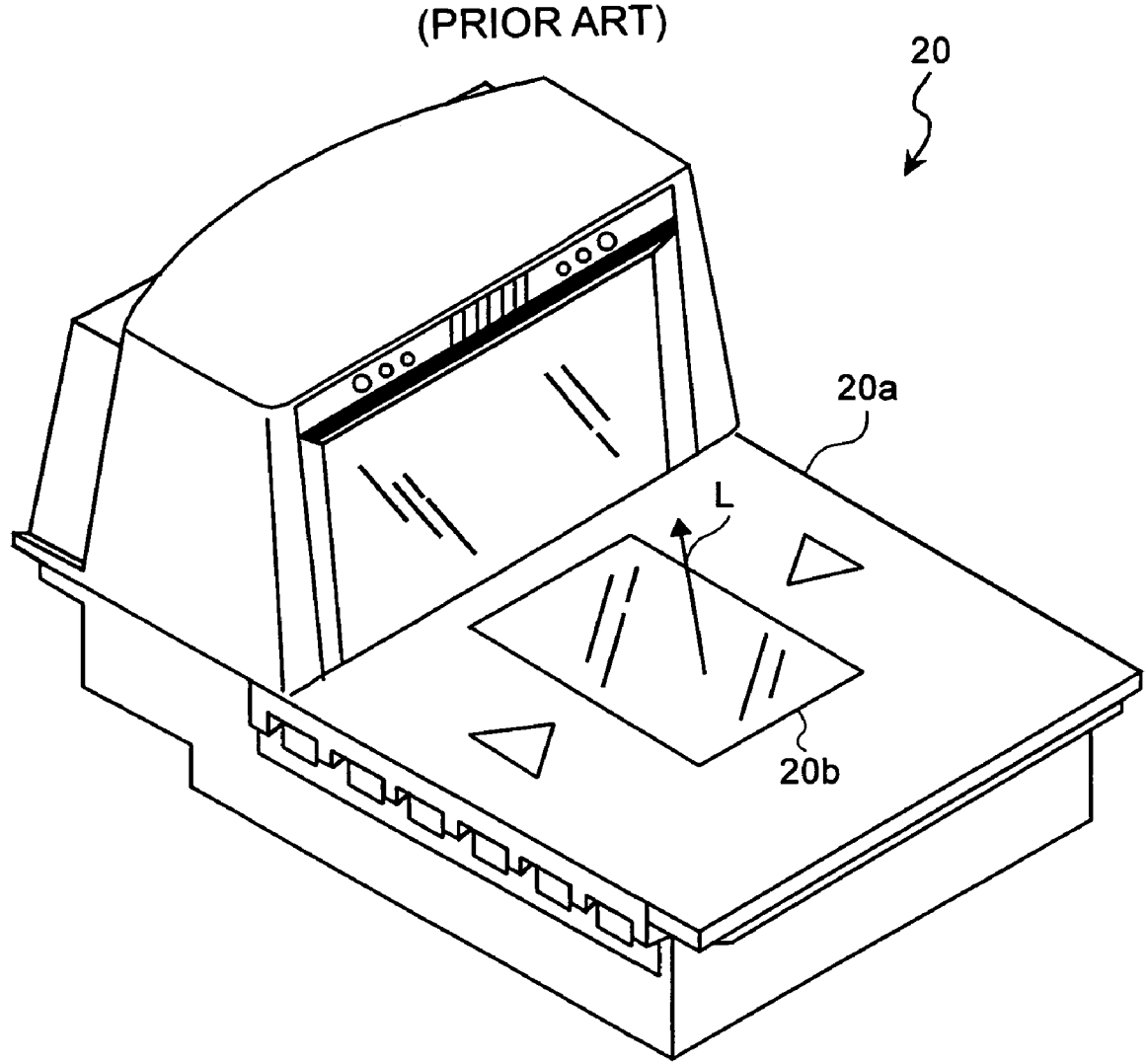
FIG. 21 is a perspective of an external configuration of a conventional barcode reader 20.

For example, according to the present embodiment, a program for realizing the function of the barcode reader 100 mentioned above may be recorded in a computer readable recording medium 300 shown in FIG. 20, the program that is recorded in the recording medium 300 may be caused to be read and realized by a computer 200, thereby realizing each function.

The computer 200 includes a central processing unit (CPU) 210 that runs the abovementioned program, an input device 220 such as a keyboard and a mouse, a read only memory (ROM) 230 that stores various types of data, a random access memory (RAM) 240, a reading device 250 that reads the program from the recording medium 300, an output device 260 such as a display and a printer, and a bus 270 that connects each component of the apparatus.

The CPU 210, run the program after reading the program that is recorded in the recording medium 300 via the reading unit 250, thereby realizing each of the functions mentioned above. An optical disc, a flexible disc, and a hard disc etc. are examples of the recording medium 300.

As described above, according to the present invention, regarding a signal corresponding to a barcode, since a low frequency component that is included in an output signal with a frequency shifted to 0 Hz based on a module frequency, is allowed to pass, based on a module frequency that is let to be extracted and an output signal of a low pass filter, a module point that is synchronized with the signal and that has a module frequency, is let to be extracted, and a character of the barcode is let to be demodulated, as compared to a configuration in which a conventional band pass filter etc. is used, an effect of reduction in throughput and an improvement in a processing speed is achieved.

Furthermore, according to the present invention, since a low pass filter is let to be a digital filter and a decimation to thin out the throughput is set, an effect of a further improvement in the processing speed is achieved.

Moreover, according to the present invention, since an error in module frequency is let to be calculated and the error is let to be corrected while the frequency is shifted, an effect of an improvement in accuracy of reading of the barcode is achieved.

Furthermore, according to the present invention, an output signal that is vectorized by the frequency shift is let to be generated, an effect of the reduction in the throughput and the improvement in the processing speed as compared to a case of a conventional Hilbert conversion, is achieved.

Moreover, according to the present invention, regarding the signal corresponding to the barcode, since the low frequency component that is included in the output signal with the frequency shifted to 0 Hz based on the module frequency, is allowed to pass, based on the module frequency that is let to be extracted and the output signal of the low pass filter, the module point that is synchronized with the signal and that has a module frequency, is let to be extracted, as compared to the configuration in which the conventional band pass filter etc. is used, the effect of reduction in the throughput and the improvement in the processing speed is achieved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A barcode reader comprising:
    a signal fetching unit that fetches a signal that includes binarized information disposed with a predetermined information length, from a barcode;
    a module-frequency extracting unit that extracts a module frequency equivalent to a basic unit length in the binarized information, from the signal;
    a frequency shifting unit that shifts a frequency to 0 Hertz based on the module frequency, for the signal;
    a low pass filter that passes a low frequency component included in an output signal from the frequency shifting unit;
    a module-point extracting unit that extracts a module point that is synchronized with the signal and that has the module frequency, based on the module frequency extracted and an output signal of the low pass filter; and
    a demodulating unit that demodulates a character of the barcode based on the module point extracted.

2. The barcode reader according to claim 1, wherein the low pass filter is a digital filter, and
    a decimation for thinning out a throughput is set in the low pass filter.

3. The barcode reader according to any of claim 1, further comprising an error calculating unit that calculates an error in the module frequency based on the signal, wherein the frequency shifting unit corrects the error when shifting the frequency.

4. The barcode reader according to claim 3, wherein the error calculating unit includes
    an error-frequency shifting unit that shifts a frequency to 0 Hertz based on the module frequency, for the signal;

an error low-pass-filter that passes a low frequency component included in an output signal of the error-frequency shifting unit; and a phase calculating unit that calculates a phase of an output signal of the error low-pass-filter, and the error calculating unit calculates the error based on the phase.

5. The barcode reader according to claim 1, wherein the frequency shifting unit generates a vectorized output signal.

6. A method of reading a barcode, the method comprising:

fetching a signal that includes binarized information disposed with a predetermined information length, from a barcode;

extracting a module frequency equivalent to a basic unit length in the binarized information, from the signal;

shifting a frequency to 0 Hertz based on the module frequency, for the signal;

passing a low frequency component included in an output signal at the shifting;

extracting a module point that is synchronized with the signal and that has the module frequency, based on the module frequency extracted and an output signal at the passing; and demodulating a character of the barcode based on the module point extracted.

7. A computer-readable recording medium that stores a computer program for reading a barcode, wherein the computer program makes a computer execute:

fetching a signal that includes binarized information disposed with a predetermined information length, from a barcode;

extracting a module frequency equivalent to a basic unit length in the binarized information, from the signal;

shifting a frequency to 0 Hertz based on the module frequency, for the signal;

passing a low frequency component included in an output signal at the shifting;

extracting a module point that is synchronized with the signal and that has the module frequency, based on the module frequency extracted and an output signal at the passing; and demodulating a character of the barcode based on the module point extracted.

8. A module-point extracting apparatus comprising:

a signal fetching unit that fetches a signal that includes binarized information disposed with a predetermined information length, from a barcode;

a module-frequency extracting unit that extracts a module frequency equivalent to a basic unit length in the binarized information, from the signal;

a frequency shifting unit that shifts a frequency to 0 Hertz based on the module frequency, for the signal;

a low pass filter that passes a low frequency component included in an output signal from the frequency shifting unit; and a module-point extracting unit that extracts a module point that is synchronized with the signal and that has the module frequency, based on the module frequency extracted and an output signal of the low pass filter.

9. The module-point extracting apparatus according to claim 8, wherein the low pass filter is a digital filter, and a decimation for thinning out a throughput is set in the low pass filter.

10. The module-point extracting apparatus according to claim 8, further comprising an error calculating unit that calculates an error in the module frequency based on the signal, wherein the frequency shifting unit corrects the error when shifting the frequency.

* * * * *